United States Patent
Fredrickson

(10) Patent No.: US 6,478,352 B1
(45) Date of Patent: Nov. 12, 2002

(54) ARTICLE MOVER

(76) Inventor: David Frank Fredrickson, 4951 Toll Bridge Rd., Belton, TX (US) 76513

( * ) Notice: Subject to any disclaimer, the term of this patent is extended or adjusted under 35 U.S.C. 154(b) by 0 days.

(21) Appl. No.: 09/449,705

(22) Filed: Nov. 24, 1999

(51) Int. Cl.⁷ .................................................. B65G 7/12
(52) U.S. Cl. .......................................... 294/15; 294/26
(58) Field of Search ........................... 294/15, 19.1, 26, 294/27.1, 32, 57–59, 55.5; D8/14; D34/28

(56) References Cited

U.S. PATENT DOCUMENTS

| | | | |
|---|---|---|---|
| 435,420 A | | 9/1890 | Healy |
| 1,411,435 A | * | 4/1922 | Hosmer .................... 294/58 X |
| 1,867,265 A | * | 7/1932 | Jensen ......................... 294/26 |
| 1,901,778 A | * | 3/1933 | Schlag ..................... 294/58 X |
| 2,274,918 A | | 6/1942 | Chenette |
| 2,367,627 A | | 8/1945 | Sterrett |
| 2,399,527 A | | 10/1946 | Whitney |
| 2,428,941 A | | 10/1947 | Packard |
| 2,739,007 A | | 3/1956 | Rauterberg |
| 2,930,583 A | | 3/1960 | Noe et al. |
| 3,014,750 A | * | 12/1961 | Briggs ......................... 294/58 |
| 3,136,574 A | * | 6/1964 | Pasquale .................. 294/58 X |
| 3,203,506 A | | 8/1965 | Masterson |
| 3,385,625 A | | 5/1968 | Heines |
| D217,002 S | | 3/1970 | Wagner |
| 3,619,852 A | | 11/1971 | Eckberg |
| 3,940,171 A | | 2/1976 | Carlsson |
| 4,098,442 A | | 7/1978 | Moore |
| 4,106,681 A | * | 8/1978 | Bott .......................... 294/26 X |
| 4,113,160 A | | 9/1978 | Spiers |
| 4,135,655 A | * | 1/1979 | Brown ..................... 294/15 X |
| 4,177,911 A | | 12/1979 | Griffin |
| D255,317 S | | 6/1980 | Slinkard |
| D288,276 S | | 2/1987 | Harney |
| 4,690,447 A | * | 9/1987 | Adams ...................... 294/58 X |
| 4,767,141 A | * | 8/1988 | Martin ...................... 294/58 X |
| 5,069,495 A | | 12/1991 | Mears |
| 5,127,693 A | | 7/1992 | Pruit |
| 5,171,052 A | | 12/1992 | Cunningham |
| 5,190,329 A | | 3/1993 | Steer et al. |
| 5,257,843 A | | 11/1993 | Nunn |
| D349,437 S | * | 8/1994 | Mock et al. .............. 294/15 X |
| D351,769 S | | 10/1994 | Brass et al. |
| D370,612 S | * | 6/1996 | Meakin et al. ............ 294/58 X |
| 5,522,116 A | | 6/1996 | Enneking et al. |
| D404,985 S | | 2/1999 | Fredrickson |
| D412,270 S | | 7/1999 | Fredrickson |

FOREIGN PATENT DOCUMENTS

| | | | |
|---|---|---|---|
| DE | 1114353 | * 9/1961 | .................. 294/58 |
| DE | 3921366 A1 | 1/1991 | |
| GB | 1200132 | 7/1970 | |

* cited by examiner

Primary Examiner—Johnny D. Cherry
(74) Attorney, Agent, or Firm—Merek & Voorhees

(57) ABSTRACT

A device for lifting, carrying, and otherwise moving objects and articles such as appliances, boxes, cartons, building materials, construction materials, gardening products, furniture, landscaping supplies, lumber, and metal or non-metal piping, In one form, the device includes a base, a handle and at least two handle grips to provide the individual with greater flexibility in positioning his or her hands on the device to lift or carry a given object. In another form, the device is provided with a base, a handle and at least one moveable handle grip which again provides the individual with greater flexibility in locating his or her hands relative to the object to be lifted. In a further form, the device includes a base, a handle and at least one handle grip. In this form, at least one of the elements of the device is removable from the other components to allow an individual to readily substitute parts or vary the position of one part relative to another to make a given lifting or carrying task easier.

9 Claims, 13 Drawing Sheets

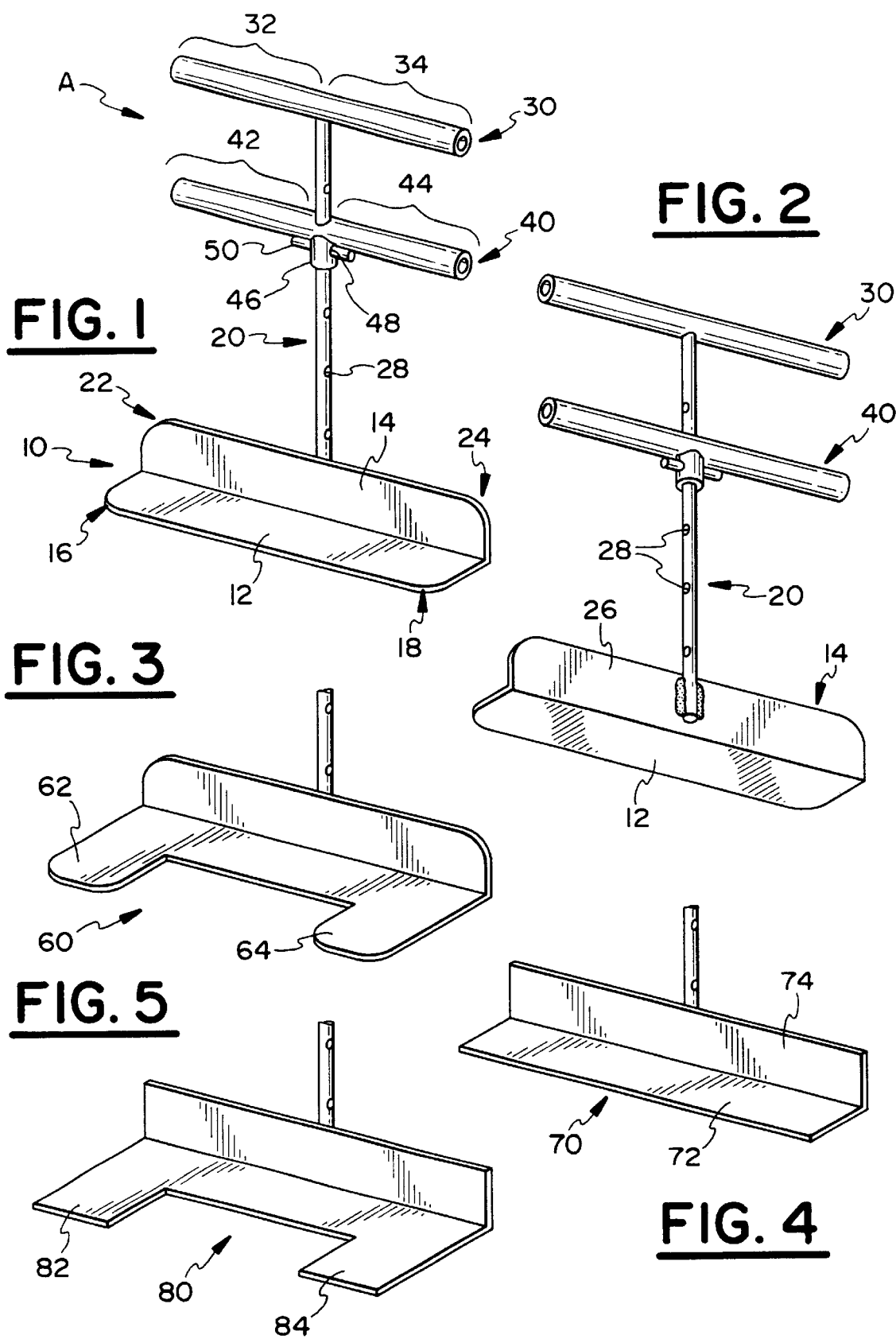

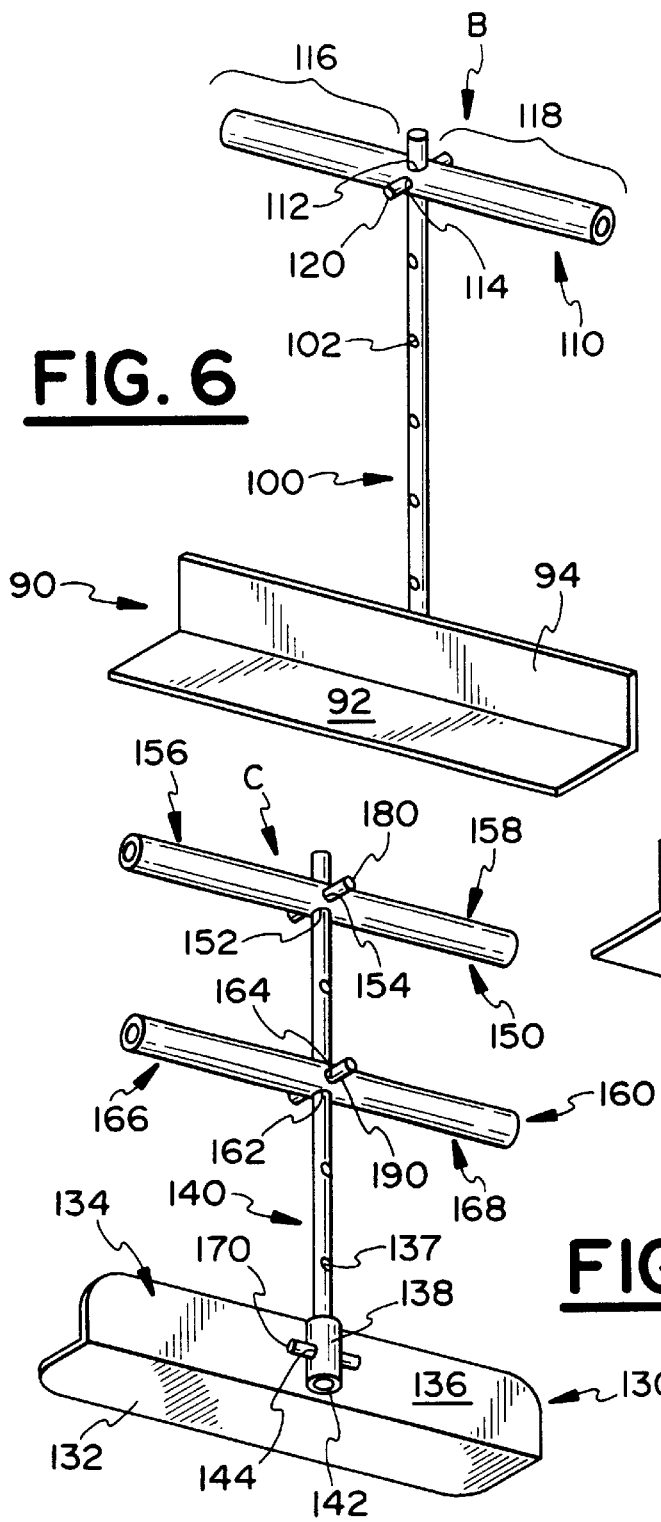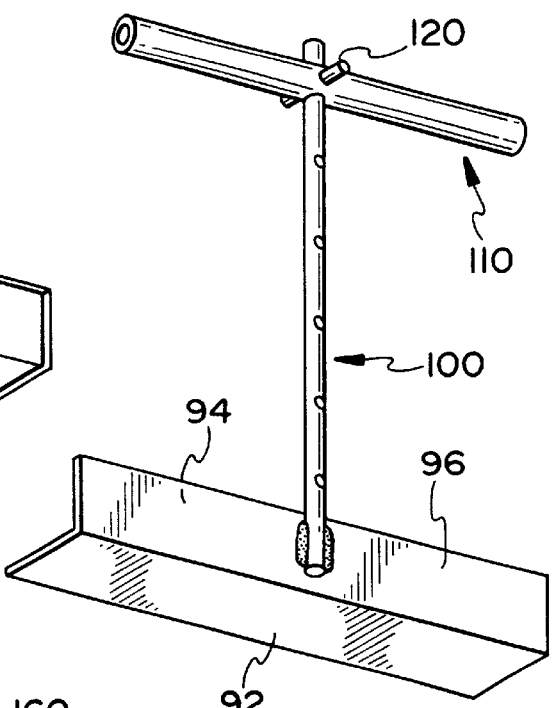

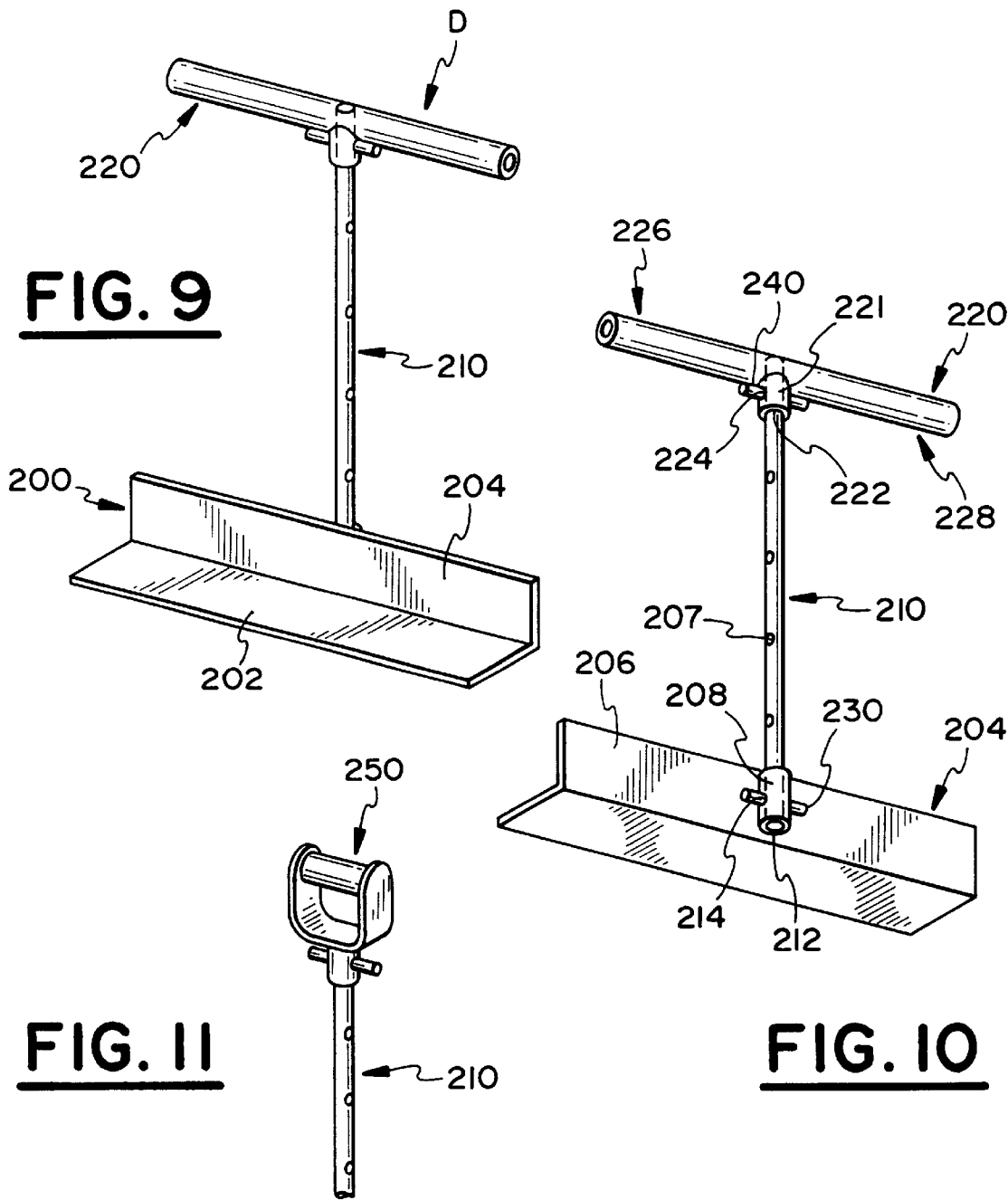

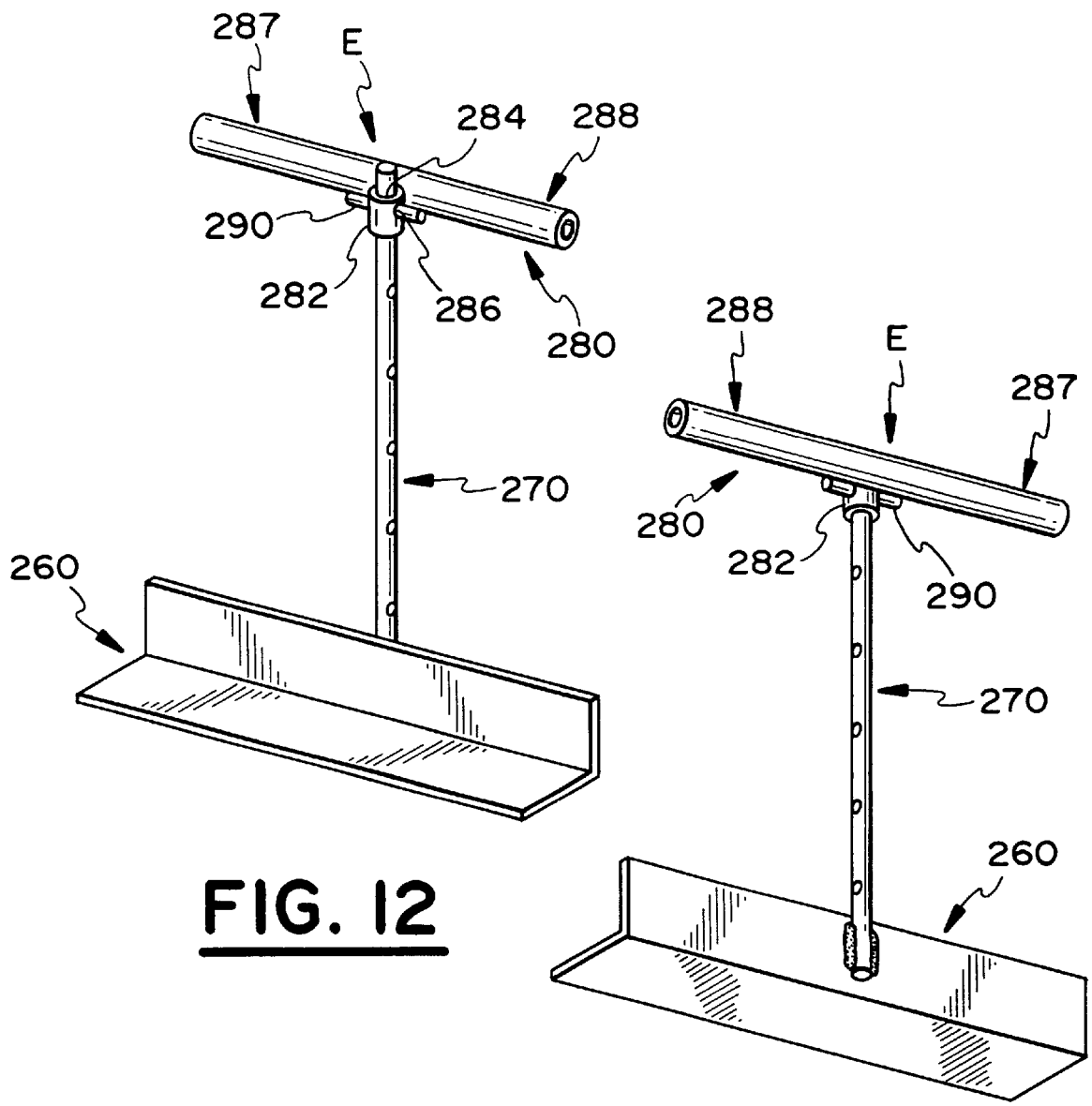

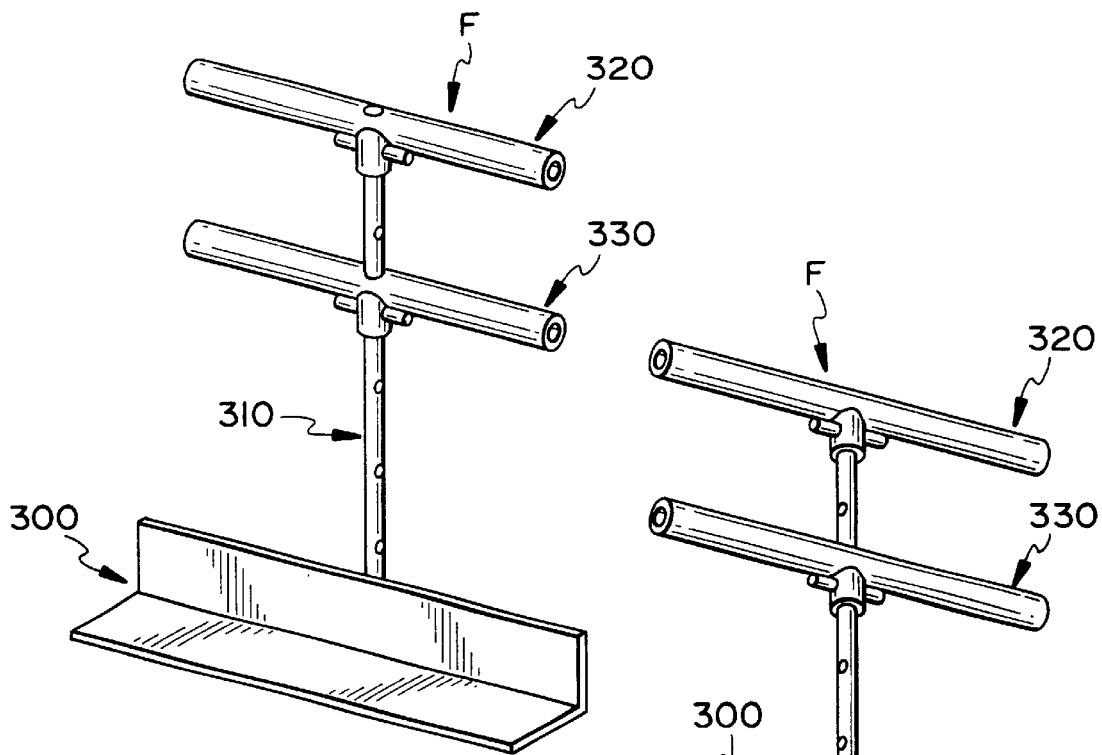
FIG. 14
FIG. 15
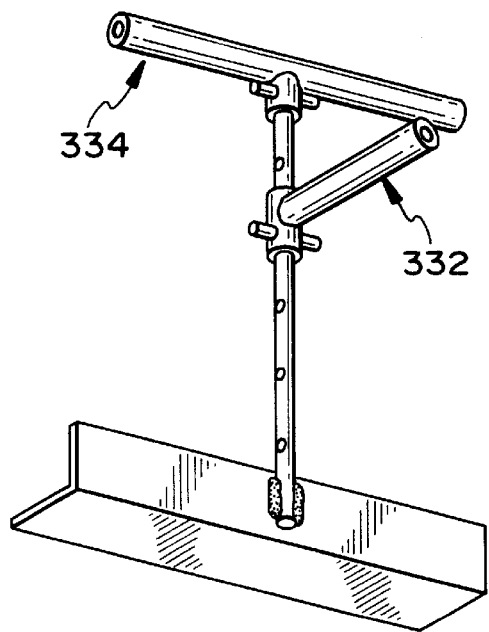
FIG. 15A

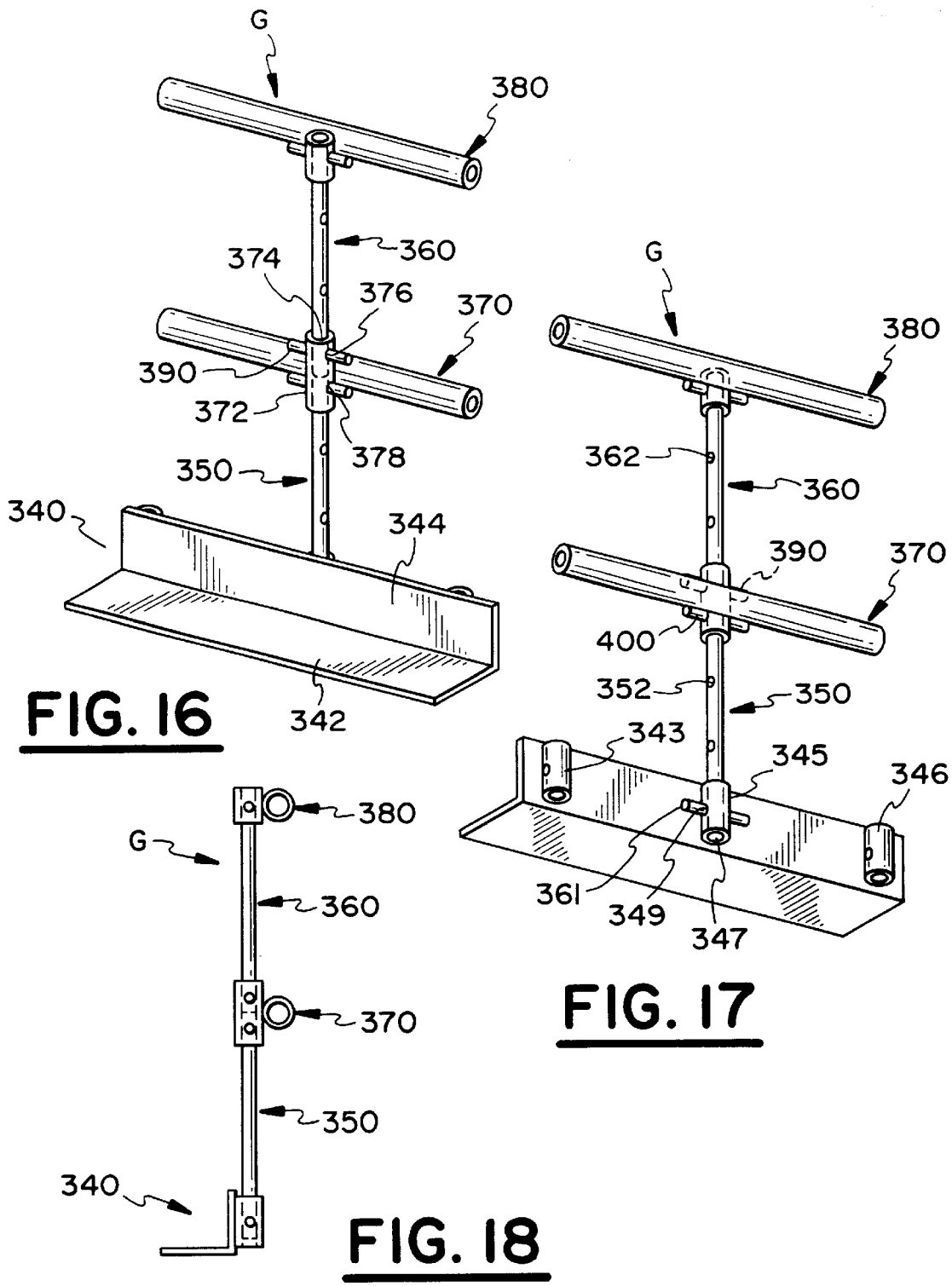

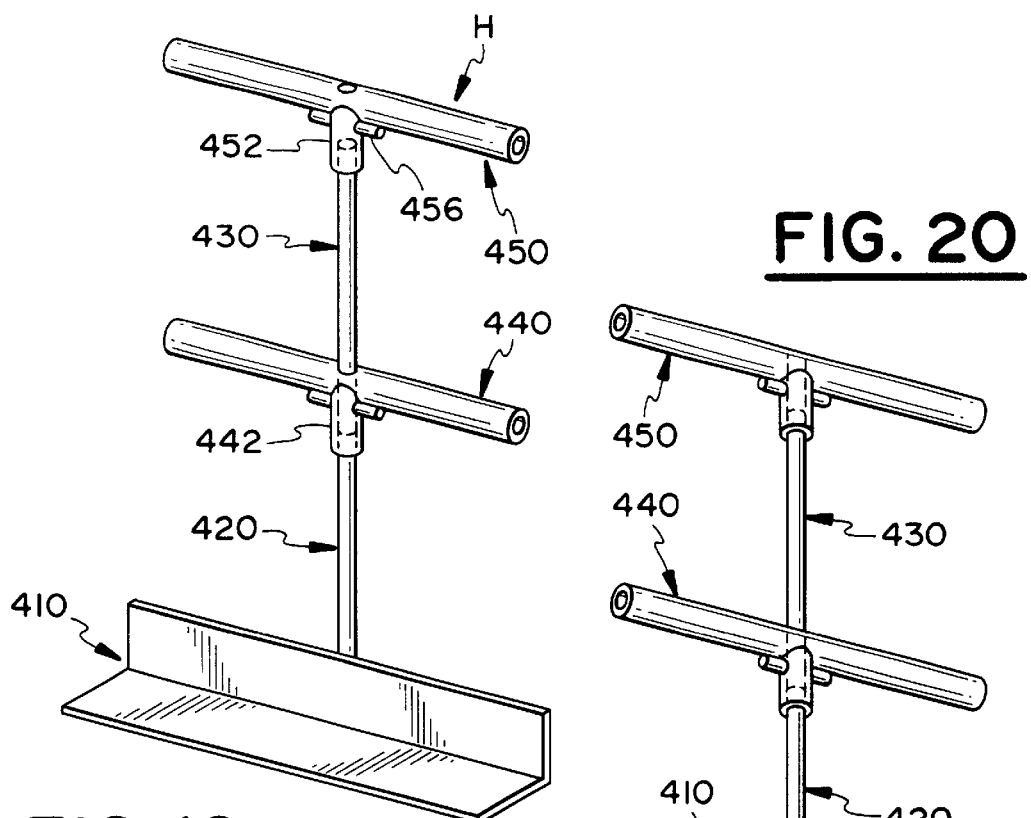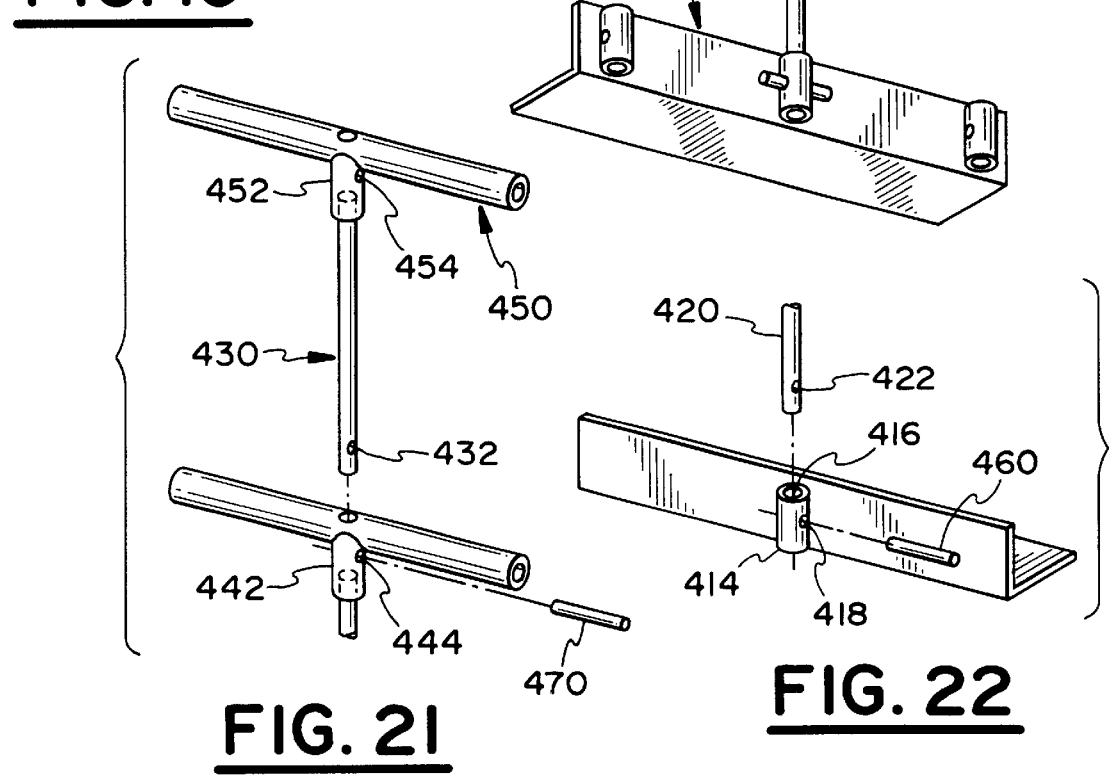

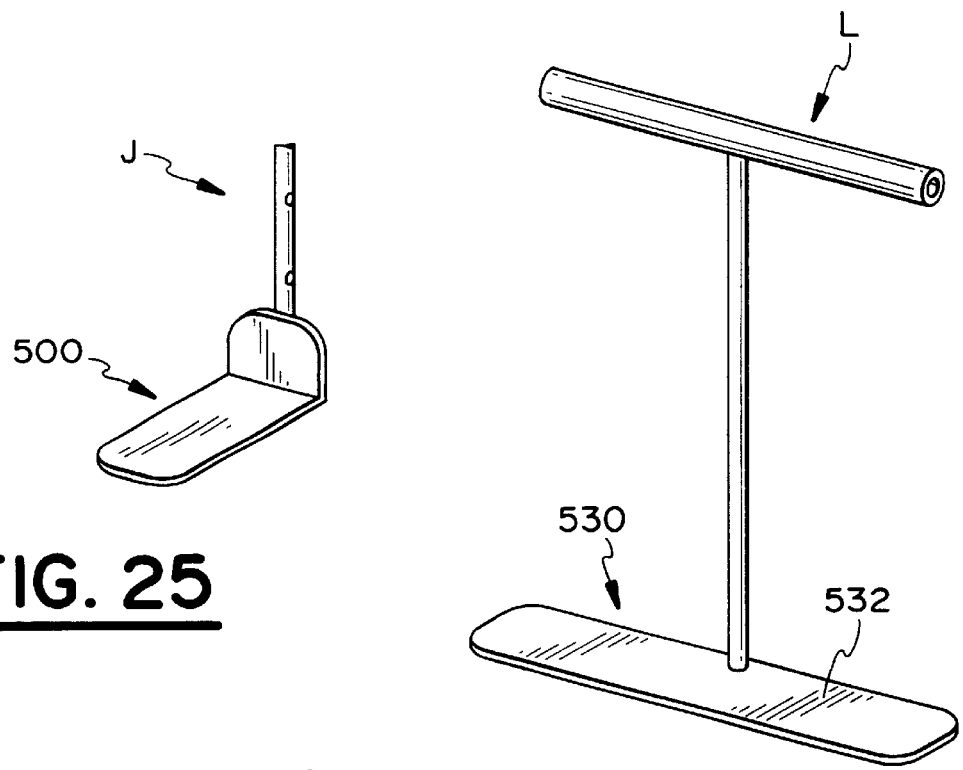
FIG. 25
FIG. 27
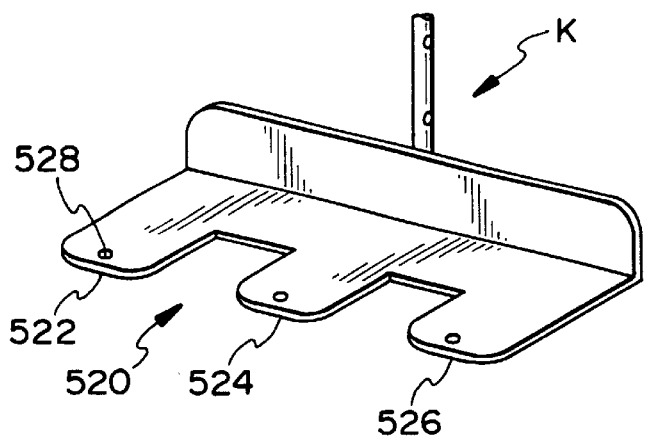
FIG. 26
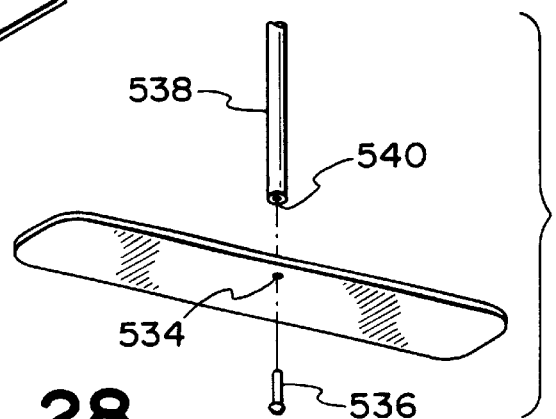
FIG. 28

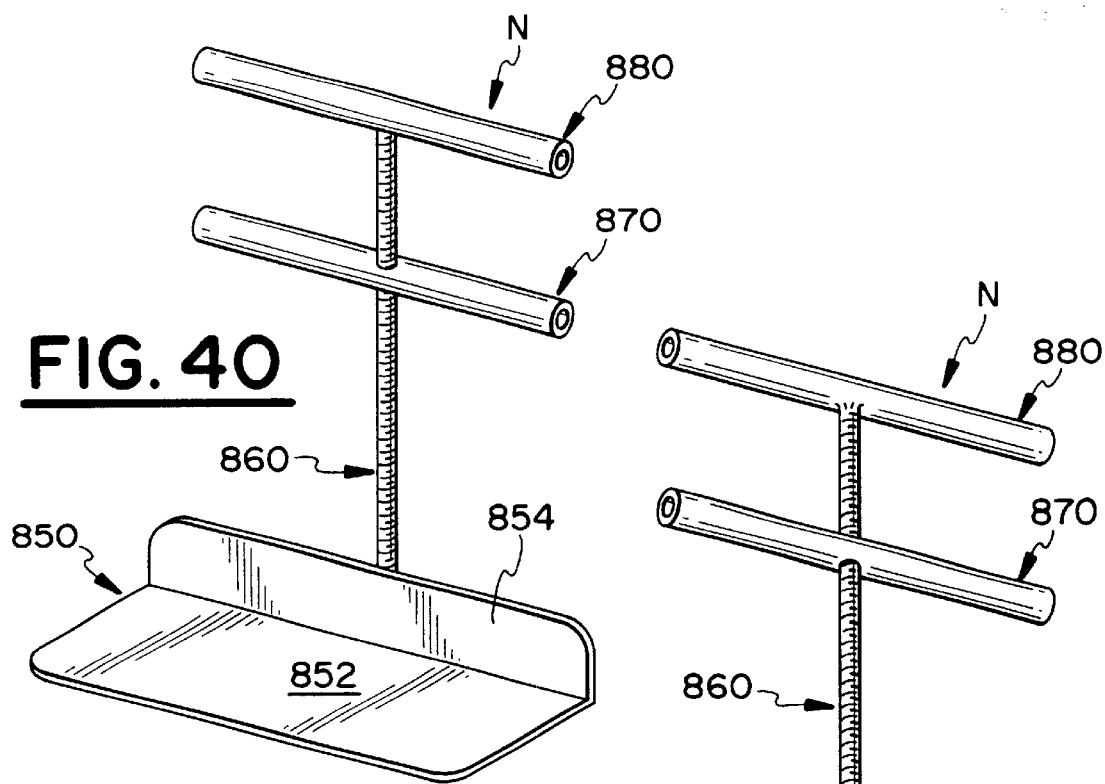
FIG. 40
FIG. 41
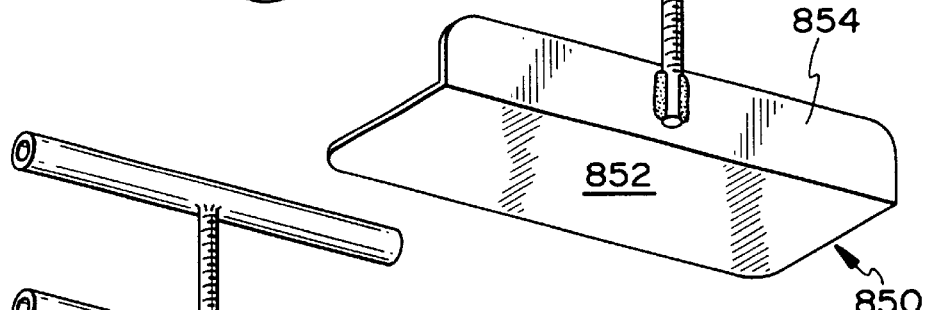
FIG. 42
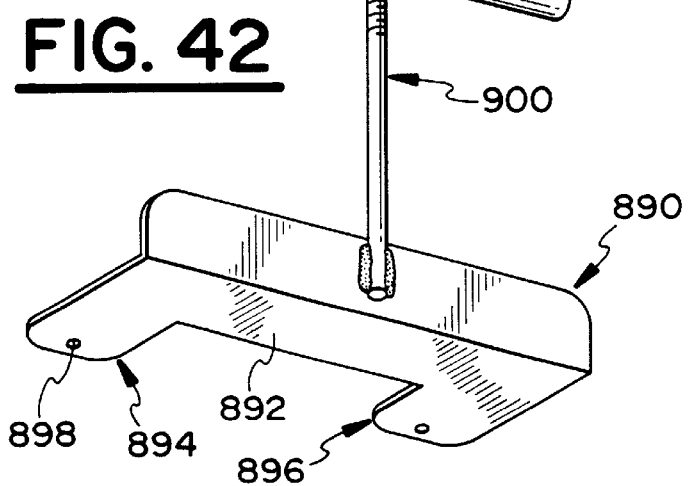

ARTICLE MOVER

FIELD OF THE INVENTION

The present invention is directed to manually operable devices which facilitate the processes of lifting, carrying, or otherwise moving of such articles as appliances, boxes, cartons, building materials, construction materials, gardening products, furniture, landscaping supplies, lumber, and metal or nonmetal piping, etc. The aforementioned reference to specific types of articles to be lifted, carried, or otherwise moved is not to be construed as limiting the invention to those articles. On the contrary, the present invention can be utilized to lift, carry, or otherwise move a great variety of different types and sizes of articles and objects other than those referenced above.

BACKGROUND OF THE INVENTION

The lifting, carrying, or otherwise moving of objects of varying sizes, weights, and configurations are fundamental aspects of normal human existence. Many who are not able to perform these functions adequately are severely restricted in their personal and professional lives. Unfortunately, the human body is often not well adapted to withstand, without injury, pain, or discomfort, many forces, strains, and pressures that are often a fundamental and inescapable part of the lifting, carrying, and other moving processes.

For this primary reason, the improper lifting, carrying, and other moving of even relatively lightweight, conventionally shaped, or awkwardly shaped articles or objects can and often does result in severe back and other bodily injuries and lifetime problems with lower back pain, etc. for the affected party. Heavy objects may pose even greater risks and problems. While some of these injuries, and their effects, can be healed or otherwise mitigated in their preliminary effects and ultimate consequences, many result in irreversible physical and emotional damage. Often those who cannot adequately perform functions related to the normal ability to lift, carry, or otherwise move articles or objects may be classified as temporarily or permanently disabled.

Whether such injuries that accrue, or are suffered, from the improper lifting and carrying or movement of articles or objects are temporary or permanent, the collective results are reflected in tremendous, and often unnecessary, economic, individual and societal costs.

On a personal level such injuries may result in temporary or permanent disabilities that preclude, or seriously limit, the injured party from engaging in activities that are a normal and meaningful part of human activities. The physical limitation imposed by these injuries can, and quite often does, have serious emotional consequences as well.

Within a work environment such injuries may result in temporary or permanent disabilities or limitations which preclude, or seriously limit, the ability of the affected party to fully or partially engage in those activities that are a normal part of the affected party's job description.

These limitations often result in decreased workplace productivity and flexibility and tremendous Workers' compensation costs. The aggregate nationwide costs associated with decreased worker productivity and Workers' compensation claims are enormous. According to recent figures from the Texas Workers' Compensation Commission the costs of medical treatments (payments relating to workers injured on the job) to doctors, chiropractors, physical therapists, dentists, occupational therapists, hospitals, and others totaled nearly 963.9 million dollars in 1998 alone. This figure does not include other significant costs (such as disability payments to the injured party) which result from workplace injuries. While not all these costs are the result of injuries resulting from the lifting, carrying, or other moving of articles or objects, assuming that a significant portion of these costs is attributable to injuries performed during the performance of those activities is logical.

Within a societal context the consequences of such injuries can be staggering. Limited resources may be diverted to the rehabilitation and treatment of those who have suffered, or are suffering, the consequences of injuries incurred while lifting, carrying, or otherwise moving articles or objects.

There are millions of disabled and other Americans who are excludable, or excluded, from jobs because they are unable to satisfactorily meet the physical requirements that may be involved in many lifting, carrying, and moving processes. When fully and correctly utilized, the present invention can mitigate existing physical limitations, more fully utilize physical abilities to accomplish assigned tasks, and minimize the likelihood of future injuries that will limit a vocational and vocational activities.

An extremely important aspect of the present invention is that it helps maximize the use of available strength relative to the accomplishment of desired tasks. By doing this the present invention opens employment and recreational opportunities for millions of Americans who are too weak to lift, carry or otherwise move articles or objects in traditional manners.

The widespread use of the present invention can enhance workplace productivity by making a higher and more efficient utilization of the work force possible. This may be accomplished in substantial part by facilitating the integration of many injured individuals, individuals susceptible to injury, or disabled individuals, into their previous or other jobs by substantially lessening the physical demands, and attendant risks, of many employment tasks that include lifting, carrying or moving elements.

The use of the present invention can also enable single parent families and the increasing millions of older Americans to be more fully integrated into independent living lifestyles. Independent living can be characterized by the ability to do, and engage in, those activities that are a normal part of human existence without assistance. The lifting, carrying, and otherwise moving of different articles or objects are fundamentally related to those activities. Because the present invention makes it easier to lift, carry, and otherwise move articles and objects such as furniture and groceries within the home, and to and from the home, senior citizens and single mothers can be less dependent on others. By using the present invention, often hard to find helpers may be dispensed with while accomplishing the desired task(s). This increases independence and decreases dependence.

The widespread use of the present invention may also make enormous contributions to the cause of integrating disabled and physically limited Americans into normal personal and professional activities, lifestyles, and jobs that may involve the lifting, carrying, or moving of articles or objects.

For many reasons it is eminently more sensible to prevent injuries than to attempt, often without success, to cure or mitigate them. This is best done by accomplishing the objective of enabling the assigned task or tasks to be completed while simultaneously removing the need to engage in the types of lifting, carrying, and moving behavior that commonly results in injuries. This use of the present invention greatly facilitates the accomplishment of that objective by fundamentally changing the way in which articles and objects can be lifted, carried, or otherwise moved.

It is hoped that an increased awareness of the principals demonstrated in the present invention will result in the widespread use of this device and that such use will fundamentally change the way articles and objects are handled and packaged as well as the way that such articles and objects are subsequently lifted, carried, or otherwise moved.

It is also hoped that there will be fundamental and widespread changes in the manner that lifting, carrying, and other moving are commonly performed in order to take advantage of the value of this device and minimize much of the pain, suffering, and human misery that so often accompany avoidable, and unnecessarily incurred, workplace and non work place injuries.

If articles and objects are manufactured in such a manner as to optimally interface with the use of the present invention there can be an immensely greater reduction in the work and non-workplace injuries which are normally attributable to the lifting, carrying, or moving process.

This device facilitates the accomplishment of many of the above referenced objectives of reducing injuries, or mitigating the adverse impact of injuries, relating to the carrying, lifting, and moving processes. The present invention does this by fundamentally changing the way many articles and objects can be lifted, carried, or otherwise moved. This will be explained in detail in the following text and the description of the preferred forms of the present invention.

OBJECTS AND SUMMARY OF THE INVENTION

An object of the present invention is to provide a novel and unobvious device for the lifting, carrying or otherwise moving of articles or objects of differing configurations, sizes, and weights.

Another object of an embodiment of the present invention is to provide a device that permits an individual to lift, carry, or otherwise move relatively heavy or awkwardly shaped articles or objects without the assistance of others.

A further object of an embodiment of the present invention is to provide an article mover that permits an individual or individuals to lift, carry or otherwise move articles or objects with the individual's arm, or arms, fully or virtually fully, extended.

A further object of an embodiment of the present invention is to provide an article mover that permits an individual or individuals to lift, carry or otherwise move articles or objects that would not be within the user's capabilities without the use of the device.

A further object of an embodiment of the present invention is to provide an article mover that permits an individual or individuals to lift, carry or otherwise move articles or objects in such a manner as to minimize the risk of injury during the execution of those tasks.

A further object of an embodiment of the present invention is to provide an article mover that permits an individual or individuals to engage in lifting, carrying or otherwise moving articles or objects that would not normally be within the user's parameters of acceptable task execution risks without the use of the device.

A further object of an embodiment of the present invention is to provide an article mover that enables an individual or individuals to lift, carry or otherwise move articles or objects across surfaces of varying elevational levels that would not conveniently or otherwise be within the user's capabilities without the use of the device.

An object of the present invention is to provide an article mover that permits an individual or individuals to lift, carry or otherwise move articles or objects across surfaces of equal or varying elevational levels while the individuals feet remain totally, or virtually totally, stationary.

An object of the present invention is to provide an article mover that permits an individual or individuals to lift, carry or otherwise move articles or objects across, or from and to, surfaces of equal or varying elevational levels while moving the optimally minimal amount while engaging in task execution.

A further object of the present invention is to provide an article mover that permits an individual or individuals to lift, carry or otherwise move articles from one area to another area while the individual's feet remain totally, or virtually totally, stationary.

A further object of the present invention is to provide an article mover that permits an individual or individuals to lift, carry or otherwise move articles or objects to and from secondary surfaces such as, but not limited to, assembly lines, pallets, or shelves.

Yet a further object of an embodiment of the present invention is to provide a device that can be used to lift, carry or otherwise move a wide variety of types and sizes of articles and objects.

A further object of an embodiment of the present invention is to provide an article mover that permits an individual or individuals to lift, carry or otherwise move articles or objects which have primary mover contact surfaces which are at varying distances from the surface the object is to be lifted, carried, or otherwise moved from.

Still another object of an embodiment of the present invention is to provide an article mover that can be readily used by a plurality of operators to lift, carry or otherwise move large, awkwardly shaped, and heavy objects.

Yet another object of one aspect of the present invention is to provide a device that can be readily adjusted to meet the particular requirements for lifting, carrying, or otherwise moving a given object.

Yet another object of one aspect of the present invention is to provide a device that has a foot or feet attached to the base which can be adjusted in length to meet the particular requirements for lifting, carrying, or otherwise moving a given object.

Yet another object of one aspect of the present invention is to provide a device that has a foot or feet attached to the base which can be adjusted in width to meet the particular requirements for lifting, carrying, or otherwise moving a given article or object.

Yet another object of one aspect of the present invention is to provide a device that has a foot or feet attached to the base which can be adjusted in length and width to meet the particular requirements for lifting, carrying, or otherwise moving a given article or object.

Yet another object of one aspect of the present invention is to provide a device with a component or components that can be readily adjusted to meet the particular physiological needs or limitations of the individual or individuals engaged in the lifting, carrying, or otherwise moving of a given article or object.

Yet another object of one aspect of the present invention is to provide a device with a component or components that can be readily adjusted to meet the particular psychological needs or limitations of the individual or individuals engaged in the lifting, carrying, or otherwise moving of a given article or object.

Yet still another object of one aspect of the present invention is to provide a device that has at least one element that can be readily adjusted to meet changing requirements for lifting, carrying, or otherwise moving a given article or object.

Yet still another object of one aspect of the present invention is to provide a device that has at least one element that can be readily adjusted to meet changing requirements for lifting, carrying, or otherwise moving a plurality of articles or objects.

Still yet another object of one aspect of the present invention is to provide a device with interchangeable elements such as bases, handles, or handle grips, so that an individual or individuals can readily select the element, or various elements, needed to more optimally lift, carry, or otherwise move a particular article or object.

Still yet a further object of one aspect of the invention is to provide a device that enables the user or users to easily and quickly move the user's hand or hands to different vertical positions on the device to more readily accommodate the efficient lifting, carrying, or other movement of different articles or objects.

Another object of one aspect of the invention is to provide a device that enables the user or users to have their right and left hands simultaneously placed in different vertical planes on the device and relative to the base of the device while using the device.

A further object of one aspect of the invention is to provide a device that enables the user or users to have the user's right and left hands simultaneously placed on the same vertical plane on the device while using the device.

Yet a further object of one aspect of the invention is to provide a device that enables the user or users to easily and quickly move the user's hand or hands to different vertical positions on the device to more readily accommodate the more efficient movement of objects across differing elevational surfaces.

Yet still another object of one aspect of the invention is to provide a device that enables the user to avoid or minimize the bending over and straightening up movements which are a normal part of many lifting, carrying, or other moving process(es).

Yet still another object of one aspect of the invention is to provide a device that enables the user to avoid or minimize the risk of injury, or reasonably lessen the level of potential injury, resulting from the bending over and straightening up movements which are a normal part of many lifting, carrying, or other moving process(es).

Still another object of one aspect of the present invention is to provide a device which enables the user or users to lift a given article or object to be moved the optimally least vertical distance necessary for task execution.

Still yet another object of one aspect of the present invention is to provide a device that can be effectively utilized with one or two hands of the device operator engaged with the device.

A further object of one aspect of the present invention is to provide a device that can be used by a plurality of operators while either or all operators, or any combination thereof, have their bodies facing in the direction of, or facing away from, the article or object to lifted, carried or otherwise moved.

A further object of one aspect of the present invention is to provide a device that can be used by a plurality of operators while either or all operators, or any combination thereof, may individually have one hand or both hands engaged with the device.

A further object of one aspect of the present invention is to provide a device that can be used by a plurality of operators while either or all operators, or any combination thereof, may simultaneously be on different elevational levels while the article or object is being lifted, carried or otherwise moved.

Still a further object of one aspect of the present invention is to provide a device which can be used in tandem while either or both operators are moving the article or object across unlevel surfaces.

Still a further object of one aspect of the present invention is to provide a device which contains at least one handle or handle section with at least one angled portion, which can be used, in conjunction with a handle grip or handle grips, in such a manner as to keep the operators hand or hands from being in any contact with any portion of the object being lifted, carried, or otherwise moved.

Yet still a further object of one aspect of the present invention is to provide a device that can be used to lift, carry or otherwise move a variety of objects having bottom surfaces which are at highly varying distances above the floor, ground or other support surface.

Many of these and other objects of the present invention will be readily apparent upon a review of the following detailed description of the preferred form of the invention and the accompanying drawings. These objects are not exhaustive and are not to be construed as limiting the scope of the claimed invention.

In summary, the present invention is directed to a novel and unobvious article mover for lifting, carrying, or otherwise moving articles and objects such as appliances, boxes, building materials, bulk pet food, cartons, construction materials, furniture, gardening products, landscaping supplies, lumber, and metal or nonmetal piping, etc. In one form of the present invention, the article mover includes a base, a handle and at least two handle grips to provide the individual with greater flexibility in positioning his or her hands on the article mover to lift, carry, or otherwise move a given article or object. In another form of the present invention, the article mover includes a base, a handle, a handle grip that intersects the handle at an angle, and at least one other fixed handle grip positioned along the handle, to provide the individual with greater flexibility in positioning his or her hands on the article mover to lift, carry, or otherwise move a given article or object. In a further form of the present invention, the article mover includes a base, a handle, a handle grip that intersects the handle at an angle, and at least one other movable handle grip positioned along the handle, to provide the individual with greater flexibility in positioning his or her hands on the article mover to lift, carry, or otherwise move a given article or object. In still another form of the present invention, the article mover is provided with a base, a handle and at least one moveable handle grip which again provides the individual with greater flexibility in locating his or her hands relative to the article or object to be lifted, carried, or otherwise moved. In a further form of the present invention the article mover includes a base, a handle and at least one handle grip. In this form of the invention, at least one element of the device is removable from the other components to allow an individual to readily substitute parts or vary the position of one part relative to another to make a given lifting, carrying, or other moving task easier.

BRIEF DESCRIPTION OF THE DRAWINGS

FIG. 1 is a front perspective view of a first embodiment of the present invention.

FIG. 2 is a rear perspective view of the first embodiment illustrated in FIG. 1.

FIG. 3 is a front perspective view of an alternative base portion for a device formed in accordance with the present invention.

FIG. 4 is a front perspective view of another alternative base portion for a device formed in accordance with the present invention.

FIG. 5 is a front perspective view of a further alternative base portion for a device formed in accordance with the present invention.

FIG. 6 is a front perspective view of a second embodiment of the present invention.

FIG. 7 is a rear perspective view of the second embodiment of the present invention illustrated in FIG. 6.

FIG. 8 is a rear perspective view of a third embodiment of the present invention.

FIG. 9 is a front perspective view of a fourth embodiment of the present invention.

FIG. 10 is a rear perspective view of the fourth embodiment of the present invention illustrated in FIG. 9.

FIG. 11 is a front perspective view of an alternative handle grip for a device formed in accordance with the present invention.

FIG. 12 is a front perspective view of a fifth embodiment of the present invention.

FIG. 13 is a rear perspective view of the fifth embodiment of the present invention illustrated in FIG. 12.

FIG. 14 is a front perspective view of a sixth embodiment of the present invention.

FIG. 15 is a rear perspective view of the sixth embodiment of the present invention illustrated in FIG. 14.

FIG. 15A is a rear perspective view a modified form of the sixth embodiment of the present invention illustrated in FIG. 14.

FIG. 16 is a front perspective view of a seventh embodiment of the present invention.

FIG. 17 is a rear perspective view of the seventh embodiment of the present invention illustrated in FIG. 16.

FIG. 18 is a side elevational view of the seventh embodiment of the present invention illustrated in FIG. 16.

FIG. 19 is a front perspective view of an eighth embodiment of the present invention.

FIG. 20 is a rear perspective view of the eighth embodiment of the present invention illustrated in FIG. 19.

FIG. 21 is an exploded fragmentary perspective view of the upper portion of the eighth embodiment of the present invention illustrated in FIG. 18.

FIG. 22 is an exploded fragmentary perspective view of the lower portion of the eighth embodiment of the present invention illustrated in FIG. 18.

FIG. 25 is a fragmentary front perspective view of an alternative base portion for a device formed in accordance with the present invention.

FIG. 26 is a fragmentary front perspective view of another alternative base portion for a device formed in accordance with the present invention.

FIG. 27 is a front perspective view of a tenth embodiment of the present invention.

FIG. 28 is an exploded fragmentary front perspective view of the tenth embodiment of the present invention illustrated in FIG. 27.

FIG. 40 is a front perspective view of the twelfth embodiment of the present invention.

FIG. 41 is a rear perspective view of the twelfth embodiment of the present invention illustrated in FIG. 40.

FIG. 42 is a front perspective view of a thirteenth embodiment of the present invention.

DETAILED DESCRIPTION OF THE INVENTION

Figure 23:
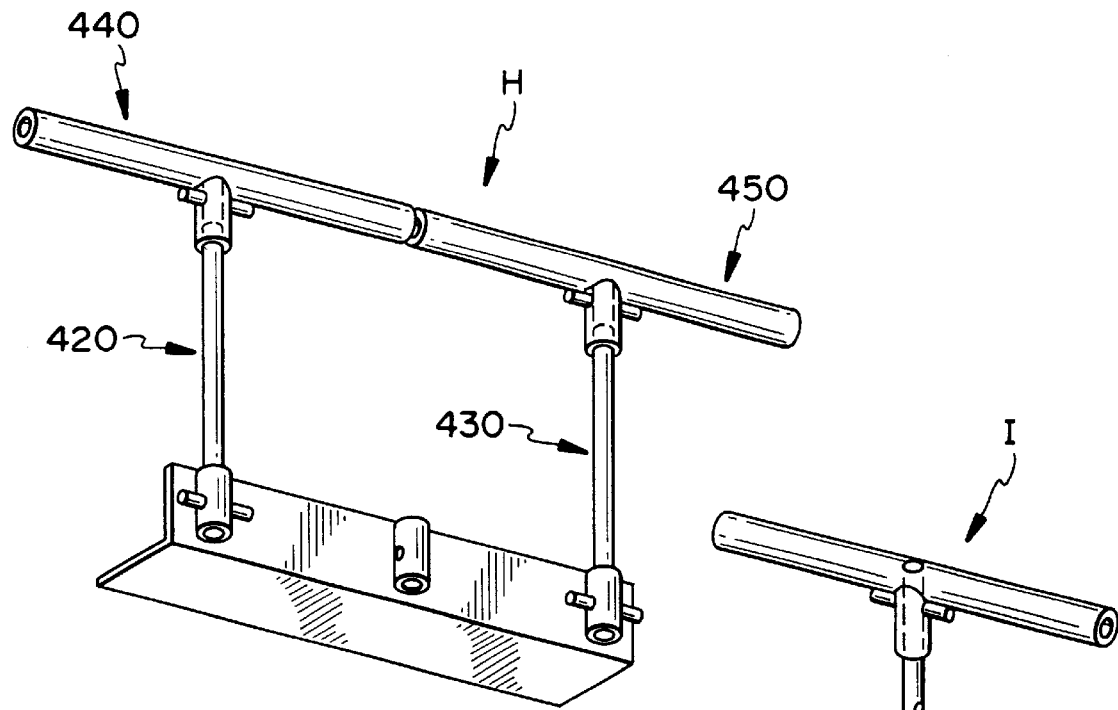
FIG. 23 is a rear perspective view of the eighth embodiment of the present invention illustrated in FIG. 19 assembled in an alternative manner.

The preferred embodiments of the present invention will now be described hereinafter with reference made to FIGS. 1 through 44.

FIGS. 1 Through 5

The first embodiment of the present invention and several variations thereof will be described with reference to FIGS. 1–5. Referring to FIGS. 1 and 2, the device A includes a base 10, a handle 20 and handle grips 30 and 40. The base 10 preferably includes a horizontal plate 12 and a vertical plate 14. The horizontal plate 12 forms the lowermost portion of the device A, i.e., no portion of the device A extends below the horizontal plate 12. The horizontal plate 12 is preferably a thin flat plate permitting the device A to readily engage an object to be lifted or otherwise moved. Preferably, the horizontal plate 12 includes rounded edges 16 and 18 to prevent damage to the article to be lifted or otherwise moved, surrounding objects and the individual using the moving device A. Vertical plate 14 extends upwardly from the horizontal plate 12. Preferably, vertical plate 14 is a thin flat plate which forms an angle of approximately 90° angle with the horizontal plate 12. However, it will be readily appreciated to those of ordinary skill in the art that the vertical plate 14 may form angles less or greater than 90° with the horizontal plate 12. For instance, in moving objects such as pipes having a circular cross-section, it may be desirable to orient the vertical plate 14 relative to the horizontal plate 12 such that an angle of less than 90° is formed to prevent the object being moved from rolling off the horizontal plate 12. Vertical plate 14 preferably includes rounded edges 22 and 24 to prevent damage to the object to be lifted or otherwise moved, the surrounding objects and the individual using the device A. Handle 20 is secured to rear face 26 of vertical plate 14. While welding is shown as one of the preferred methods of securing handle 20 to the vertical plate 14, it will be readily appreciated that the handle 20 may be secured to the vertical plate 14 in numerous different ways including but not limited to any of the alternative arrangements illustrated in the subsequent embodiments disclosed herein. One of ordinary skill in the art will readily appreciate that the thickness as well as surface texture of the plates 12 and 14 may be varied. In some instances, it may be desirable to have thick plates to move a particular object. Similarly, the surfaces of the plates 12 and 14 may be dimpled or ridged to assist in the moving of a given object from one location to another.

Preferably, handle 20 has a tubular shape. Most preferably, handle 20 has a circular cross-section. Handle 20 includes a plurality of holes 28 spaced along its longitudinal axis. Handle grip 30 is permanently secured to the handle 20, i.e. handle grip 30 can not be moved relative to or removed from handle 20. As seen in FIGS. 1 and 2, handle grip 30 is symmetrically disposed about handle 20. Accordingly, two gripping portions 32 and 34 of equal length are formed. Handle grip 40 is disposed symmetrically about handle 20 thereby forming gripping portions 42 and 44 of equal length.

Handle grip 40 further includes a hollow support collar 46. Support collar 46 has an opening 48 which aligns with openings 28 in handle 20 and receives pin 50 to position handle grip 40 at the desired location relative to the base 12. Upon removal of pin 50, an individual can readily slide handle grip 40 along handle 20 to position it at the desired location. One of ordinary skill in the art will readily appreciate that any suitable fastener may be substituted for pin 50.

Referring to FIGS. 3 through 5, several alternative forms of the base of the device are illustrated. Referring to FIG. 3, base 60 includes feet 62 and 64. The edges of feet 62 and 64 have been rounded to prevent damage to the article to be lifted or otherwise moved, surrounding objects and individuals using the device. Referring to FIG. 4, base 70 includes horizontal and vertical plates 72 and 74, respectively, having straight edges rather than the rounded edges illustrated in FIG. 1. Referring to FIG. 5, base 80 is similar to base 70 and further includes feet 82 and 84. It should be noted that these are just a few of the bases that a device formed in accordance with the present invention may have. It will be readily appreciated that any of the bases disclosed herein may be used.

FIGS. 6 and 7

A second embodiment will now be described with reference made to FIGS. 6 and 7. Device B includes a base 90, a handle 100 and a handle grip 110. Base 90 includes horizontal plate 92 which forms an angle of approximately 90o with vertical plate 94. However, it will be readily appreciated to those of ordinary skill in the art that the vertical plate 94 may form angles less or greater than 90° with the horizontal plate 92. For instance, in moving objects such as pipes having a circular cross-section, it may be desirable to orient the vertical plate 94 relative to the horizontal plate 92 such that an angle of less than 90° is formed to prevent the object being moved from rolling off the horizontal plate 92. Both plates are preferably thin flat plates to assist in positioning the device B in engagement with the article to be lifted or otherwise moved. Preferably, handle 100 is secured to the rear face 96 of vertical plate 94 such that the vertical plate 94 extends outwardly an equal distance from either side of the handle 100. While welding is shown as one of the preferred methods of securing handle 100 to the vertical plate 94, it will be readily appreciated that the handle 100 may be secured to the vertical plate 94 in numerous different ways including but not limited to any of the alternative arrangements illustrated in the previous and/or subsequent embodiments disclosed herein.

Preferably, handle 100 has a tubular shape. Most preferably, handle 100 has a circular cross-section. Handle 100 includes a plurality of holes 102 spaced along its longitudinal axis. Handle grip 110 has an opening 112 for slidably receiving handle 100. Further, handle grip 110 includes an opening 114 which aligns with holes 102 and receives pin 120. Upon removal of pin 120, an individual may readily slide handle grip 110 along the handle 100 to position the handle grip 110 at the desired location. Further, an individual may readily remove handle grip 110 from the handle 100 and substitute another type of handle grip therefor. Preferably, handle grip 110 20 is disposed symmetrically about handle 100 thereby forming gripping portions 116 and 118 of equal length. It will be readily appreciated that any of the bases disclosed herein could be substituted for base 90.

FIG. 8

A third embodiment will now be described with reference made to FIG. 8. Device C includes a base 130, a handle 140 and handle grips 150 and 160. Base 130 includes horizontal plate 132 which forms an angle of approximately 90° with vertical plate 134. However, it will be readily appreciated to those of ordinary skill in the art that the vertical plate 134 may form angles less or greater than 90° with the horizontal plate 132. For instance, in moving objects such as pipes having a circular cross-section, it may be desirable to orient the vertical plate 134 relative to the horizontal plate 132 such that an angle of less than 90° is formed to prevent the object being moved from rolling off the horizontal plate 132. Both plates are preferably thin flat plates to assist in positioning the device C in engagement with the article to be lifted or otherwise moved. Preferably, handle 140 is removably secured to the rear face 136 of vertical plate 134 such that the vertical plate 134 extends outwardly an equal distance from either side of the handle 140. Specifically, a collar 138 is welded or otherwise attached to the rear face 136 of vertical plate 134. Handle 140 has a plurality of holes 137 formed therein along its longitudinal axis.

Collar 138 has a hole 142 extending therethrough to receive the lowermost end of handle 140. Collar 138 further includes a hole 144 which aligns with a corresponding hole 137 of handle 140 and receives pin 170. Upon removal of pin 170, an individual may readily detach base 130 from the handle 140 and thereby substitute other types of bases as needed. It will be readily appreciated by one of ordinary skill in the art that any suitable fastener may be substituted for pin 170.

Preferably, handle 140 has a tubular shape. Most preferably, handle 140 has a circular cross-section. Handle grip 150 has an opening 152 for slidably receiving handle 140. Further, handle grip 150 includes an opening 154 which aligns with holes 137 in handle 140 and receives pin 180. Upon removal of pin 180, an individual may readily slide handle grip 150 along the handle 140 to position the handle grip 150 at the desired location. It will be readily appreciated by one of ordinary skill in the art that any suitable fastener may be substituted for pin 180. Preferably, handle grip 150 is disposed symmetrically about handle 140 thereby forming gripping portions 156 and 158 of equal length. Handle grip 160 has an opening 162 for slidably receiving handle 140.

Further, handle grip 160 includes an opening 164 which aligns with holes 137 in handle 140 and receives pin 190. Upon removal of pin 190, an individual may readily slide handle grip 160 along the handle 140 to position the handle grip 160 at the desired location. It will be readily appreciated by one of ordinary skill in the art that any suitable fastener may be substituted for pin 190. Preferably, handle grip 160 is disposed symmetrically about handle 140 thereby forming gripping portions 166 and 168 of equal length. It should be noted that because handle grips 150 and 160 are removable, an individual can readily detach the same from handle 140 and substitute other types of handles therefor.

FIGS. 9 Through 11

A fourth embodiment will now be described with reference made to FIGS. 9 and 10. Device D includes a base 200, a handle 210 and a handle grip 220. Base 200 includes horizontal plate 202 which forms an angle of approximately 90° with vertical plate 204. However, it will be readily appreciated to those of ordinary skill in the art that the vertical plate 204 may form angles less or greater than 90° with the horizontal plate 202. For instance, in moving objects such as pipes having a circular cross-section, it may be desirable to orient the vertical plate 204 relative to the horizontal plate 202 such that an angle of less than 90° is formed to prevent the object being moved from rolling off the horizontal plate 202. Both plates are preferably thin flat plates to assist in positioning the device D in engagement with the article to be lifted or otherwise moved. Preferably, handle 210 is removably secured to the rear face 206 of vertical plate 204 such that the vertical plate 204 extends outwardly an equal distance from either side of the handle 210. Specifically, a collar 208 is welded or otherwise attached to the rear face 206 of vertical plate 204. Handle 210 has a plurality of holes 207 formed therein along its longitudinal axis.

Collar 208 has a hole 212 extending therethrough to receive the lowermost end of handle 210. Collar 208 further includes a hole 214 which aligns with a corresponding hole 207 of handle 210 and receives pin 230. Upon removal of pin 230, an individual may readily detach base 200 from the handle 210 and thereby substitute other types of bases as may be needed. It will be readily appreciated by one of ordinary skill in the art that any suitable fastener may be substituted for pin 230.

Preferably, handle 210 has a tubular configuration. Most preferably, handle 210 has a circular cross-section. Handle grip 220 includes a support collar 221 having an opening 222 for slidably receiving handle 210. Further, support collar 221 includes an opening 224 which aligns with holes 207 in handle 210 and receives pin 240. Upon removal of pin 240, an individual may readily slide handle grip 220 along the handle 210 to position the handle grip 220 at the desired location. It will be readily appreciated by one of ordinary skill in the art that any suitable fastener may be substituted for pin 240. Preferably, handle grip 220 is disposed symmetrically about handle 210 thereby forming gripping portions 226 and 228 of equal length. It should be noted that because handle grip 220 is removable, an individual can readily detach the same from handle 210 and substitute other types of handles therefor. Handle grip 250, illustrated in FIG. 11, is one of many different handle grips which may be substituted for handle grip 220.

FIGS. 12 and 13

A fifth embodiment will now be described with reference made to FIGS. 12 and 13. Device E includes a base 260, a handle 270 and a handle grip 280. Base 260 and handle 270 are identical to base 90 and handle 100, respectively, illustrated in FIGS. 6 and 7 and, therefore, will not be described in detail hereinafter. Handle grip 280 includes a support collar 282. Collar 282 has an opening 284 for receiving the handle 270. Collar 282 further includes an opening 286 which aligns with the holes in handle 270 and receives pin 290. Handle 280 further includes gripping sections 286 and 288 which are secured to collar 282 such that the gripping sections are offset from the handle 270. Upon removal of pin 290, an individual may readily slide handle grip 280 along handle 270 to position the handle grip 280 at a desired location. It will be readily appreciated by one of ordinary skill in the art that any suitable fastener may be substituted for pin 290. Further, because handle grip 280 is removable, an individual can readily detach the same from handle 270 and substitute other types of handles.

FIGS. 14 Through 15A

A sixth embodiment of the present invention will now be described with reference made to FIGS. 14 and 15. Device F includes a base 300, a handle 310 and handle grips 320 and 330. Base 300 and handle 310 are identical to base 90 and handle 100, respectively, illustrated in FIGS. 6 and 7 and, therefore, will not be described in detail hereinafter. Handle grips 320 and 330 are identical to handle grip 220 illustrated in FIGS. 9 and 10, and, therefore, will not be described in detail hereinafter. As shown in FIG. 15 A, handle grip 332 may be positioned such that a vertical plane passing through the longitudinal axis of handle grip 332 forms approximately a 90° angle to a vertical plane passing through the longitudinal axis of handle grip 334 rather than the same vertical plane passing through the longitudinal axis of both handle grips as depicted in FIGS. 14 and 15. In such instance, the handle grip 332 preferably extends only rearwardly so as not to come into contact with the object to be lifted. Preferably, the handle grip 332 is oriented relative to handle grip 334 such that horizontal planes passing through the longitudinal axis of each handle grip extend parallel to each other.

FIGS. 16 Through 18

The seventh embodiment of the present invention will now be described with reference to FIGS. 16 through 18. Referring to FIGS. 16 and 17, the device G includes a base 340, a first handle section 350, a second handle section 360, and handle grips 370 and 380. The base 340 includes a horizontal plate 342 and a vertical plate 344. The horizontal plate 342 is preferably a thin flat plate permitting the device G to be readily inserted under an object to be lifted or otherwise moved. Vertical plate 344 extends upwardly from the horizontal plate 342. Vertical plate 344 is preferably a thin flat plate and forms an angle of approximately 90° with the horizontal plate 342. Vertical plate 344 includes collars 343, 345 and 346. Collars 343, 345 and 346 include an opening 347 for receiving one of the first and second handle sections 350 and 360. Collars 343, 345 and 346 include an opening 349 which extends transverse to opening 347. First handle section 350 includes a plurality of openings 352. Similarly, second handle section 360 includes a plurality of openings 362. It should be noted that the first handle section 350 is interchangeable with the second handle section 360. Openings 352 of the handle section 350 align with openings 349 to receive pin 361 to secure handle section 350 to a desired collar. It will be readily appreciated that any suitable fastener may be substituted for pin 361.

Handle grip 370 includes a support collar 372 having an opening 374 for receiving corresponding ends of handle sections 350 and 360. Further, collar 372 has a pair of openings 376 and 378 which extend transversely to opening 374. Opening 376 aligns with the lowermost opening 362 in second handle section 360 and receives pin 390 to secure the second handle section 360 to support collar 372. It will be readily appreciated that any suitable fastener may be substituted for pin 390. Opening 378 aligns with the uppermost opening 352 in first handle section 350 and receives pin 400 to secure the first handle section 350 to support collar 372. Handle grip 380 is identical to handle grip 280 depicted in FIGS. 12 and 13 and, therefore, will not be described in detail hereinafter.

FIGS. 19 Through 24

The eighth embodiment of the present invention will now be described with reference to FIGS. 19 through 23. Referring to FIGS. 19 and 20, the device H includes a base 410, a first handle section 420, a second handle section 430, and handle grips 440 and 450. Base plate 410 is identical to base plate 340 depicted in FIGS. 16 and 17 and, therefore, will not be described in detail hereinafter. As best seen in FIG. 21, first handle section 420 is welded to support collar 442 of handle grip 440. Similarly, second handle section 430 is welded to support collar 452 of handle grip 450.

Referring to FIG. 22, collar 414 of base 410 includes openings 416 and 418. The lowermost portion of first handle section 420 is inserted into opening 416. Opening 418 aligns with opening 422 of first handle section 420 and receives pin 460 to secure the first handle section to base 410. It should be noted that the two outside collars formed on the vertical plate of the base depicted in FIG. 20 have been omitted from FIG. 22 so that the manner of connecting the first handle section 420 to the base can be readily illustrated.

Figure 24:
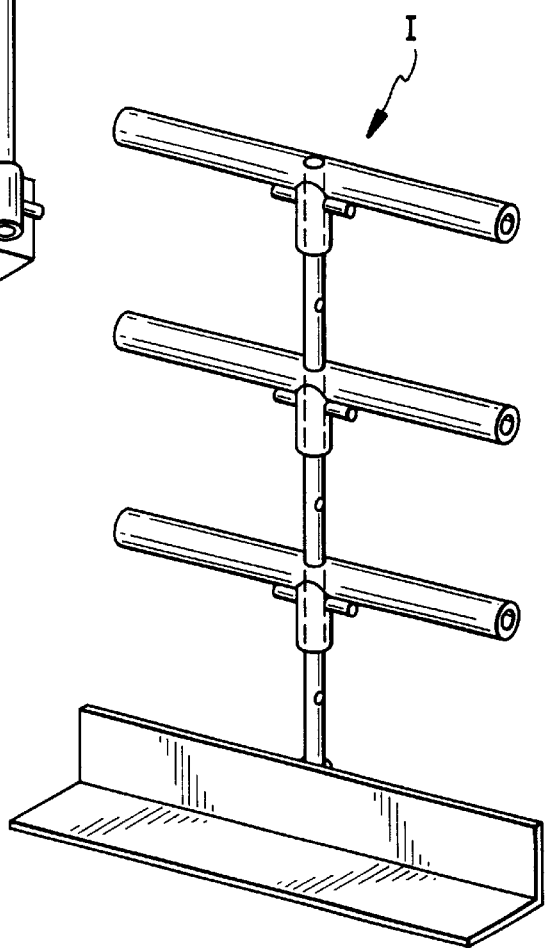
FIG. 24 is a front perspective view of a ninth embodiment of the present invention.

Referring to FIG. 21, second handle section 430 has an opening 432 which aligns with opening 444 formed in support collar 442 and receives pin 470 to secure the second handle section 430 thereto. Handle grip 450 includes a support collar 452 with an opening 454 for receiving pin 456. Pin 456 is provided in the event that it is desired to secure an additional handle section and handle grip to support collar 452. Such an arrangement is depicted in FIG. 24. Referring to FIG. 23, an alternative manner of attaching the first and second handle sections 420 and 430 and corresponding handle grips 440 and 450 to base 410 is depicted.

Referring to FIG. 24, a ninth embodiment is disclosed which is exactly the same as the embodiment disclosed in FIGS. 19 through 23 with the sole exception that the device I includes a third handle section and corresponding handle grip.

It will be readily appreciated by one of ordinary skill in the art that any suitable fasteners may be substituted for pins 456, 460 and 470.

FIGS. 25 Through 28

FIGS. 25 through 28 depict alternative configurations for the base of a device formed in accordance with the present invention. Referring to FIG. 25, device J, only a portion of which is illustrated, includes an elongated base 500 having rounded edges. Referring to FIG. 26, device K, only a portion of which is illustrated, base 520 includes feet 522, 524 and 526. Each of the feet are provided with an opening 528. Openings 528 provide an individual with a ready means to secure an article to be carried to the device through ropes, straps and the like. Also, the openings permit two devices to be secured together. Alternatively, rubber inserts or inserts of other material may be positioned in the openings to vary the coefficient of friction of the base to assist in moving a given object.

Referring to FIGS. 27 and 28, a tenth embodiment of the present invention will now be described. Device L includes a base 530 which has only a horizontal plate 532. An opening 534 is formed in the base plate to receive screw 536 or other suitable fastener. Preferably, opening 534 is formed such that the head of screw 536 lies substantially flush with the bottom surface of plate 532. Handle 538 includes an opening 540 for receiving screw 536. Alternately, handle 538 may be welded or otherwise permanently attached to base 530 or base plate 532.

FIGS. 29 Through 37

Figure 29:
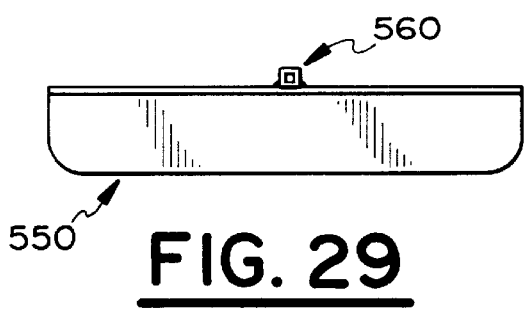
FIGS. 29 through 37 are plan views depicting alternative forms of the handle of a device formed in accordance with the present invention.
Figure 30:
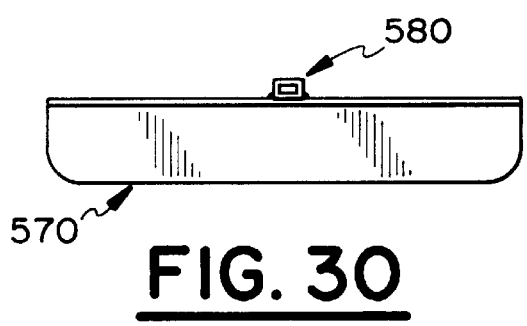
Figure 32:
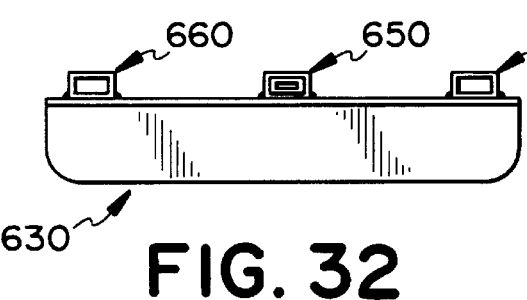

In FIGS. 29 through 37, various alternative handle/base arrangements are depicted. Referring to FIG. 29, base 550 is identical to base 10 depicted in FIG. 1. Handle 560 is similar to handle 20 shown in FIG. 1 with the sole exception that handle 560 has a square cross-section. Base 570, shown in FIG. 30, is the same as that depicted in FIG. 29. Handle 580 has a rectangular configuration as opposed to the square configuration of handle 560. Base 590 shown in FIG. 31 includes three collars 600, 610 and 620 for receiving handles having a square configuration. Collars 600, 610 and 620 are the same as collars 343, 345 and 346 with the sole exception being the shape. Base 630 depicted in FIG. 32 is the same as base 590 shown in FIG. 31 with the sole exception being that collars 640, 650 and 660 are shaped to receive handles having a rectangular configuration.

Figure 33:
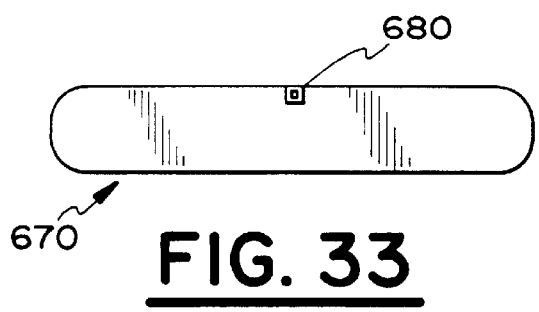
Figure 34:
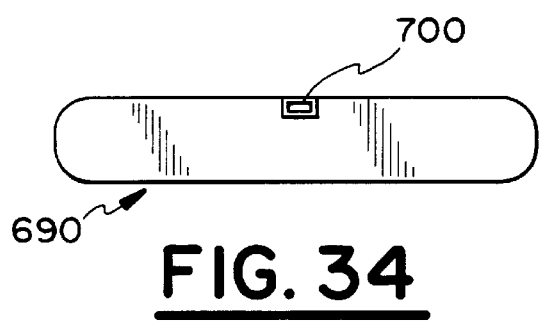
Figure 31:
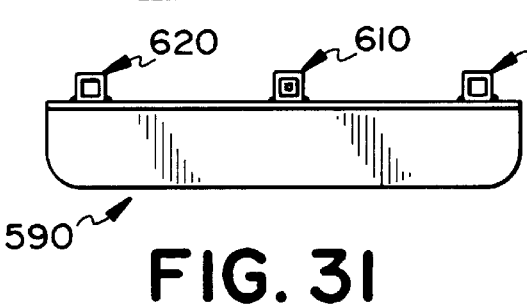
Figure 35:
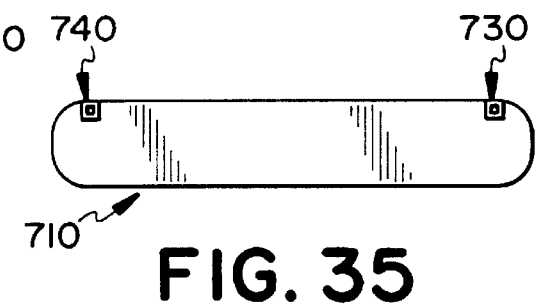
Figure 36:
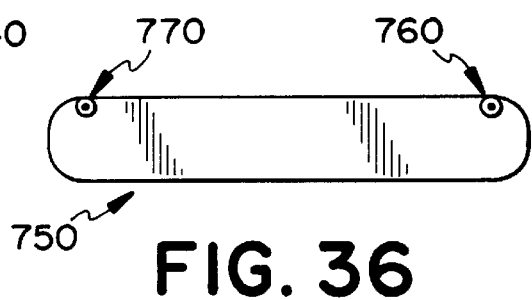
Figure 37:
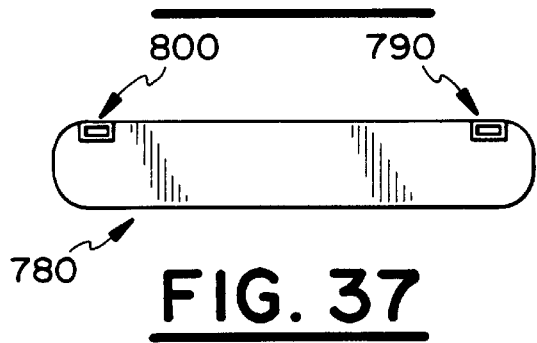

Base 670 depicted in FIG. 33 is the same as the base 530 shown in FIGS. 27 and 28. Handle 680 differs from handle 538 of figures 27 and 28 in that handle 680 has a square cross-section. Referring to FIG. 34, base 690 is identical to base 670. Handle 700 has a rectangular cross-section as opposed to the square cross-section of handle 680. Base 710 depicted in FIG. 35 is the same as base 670 shown in FIG. 33. Handles 730 and 740 are attached to opposite sides of base 710 in the same manner as depicted in FIGS. 27 and 28 or alternatively may be permanently or otherwise attached. Base 750 shown in FIG. 36 is the same as base 670 depicted in FIG. 33. Handles 760 and 770 are attached to opposite ends of base 750 in the same manner as depicted in FIGS. 27 and 29. Handles 760 and 770 have a circular cross-section. Base 780 shown in FIG. 37 is the same as base 670 depicted in FIG. 33. Handles 790 and 800 are attached to opposite ends of base 780 in the same manner as depicted in FIGS. 27 and 28. Handles 790 and 800 have a rectangular cross-section.

Figures 38, 39:
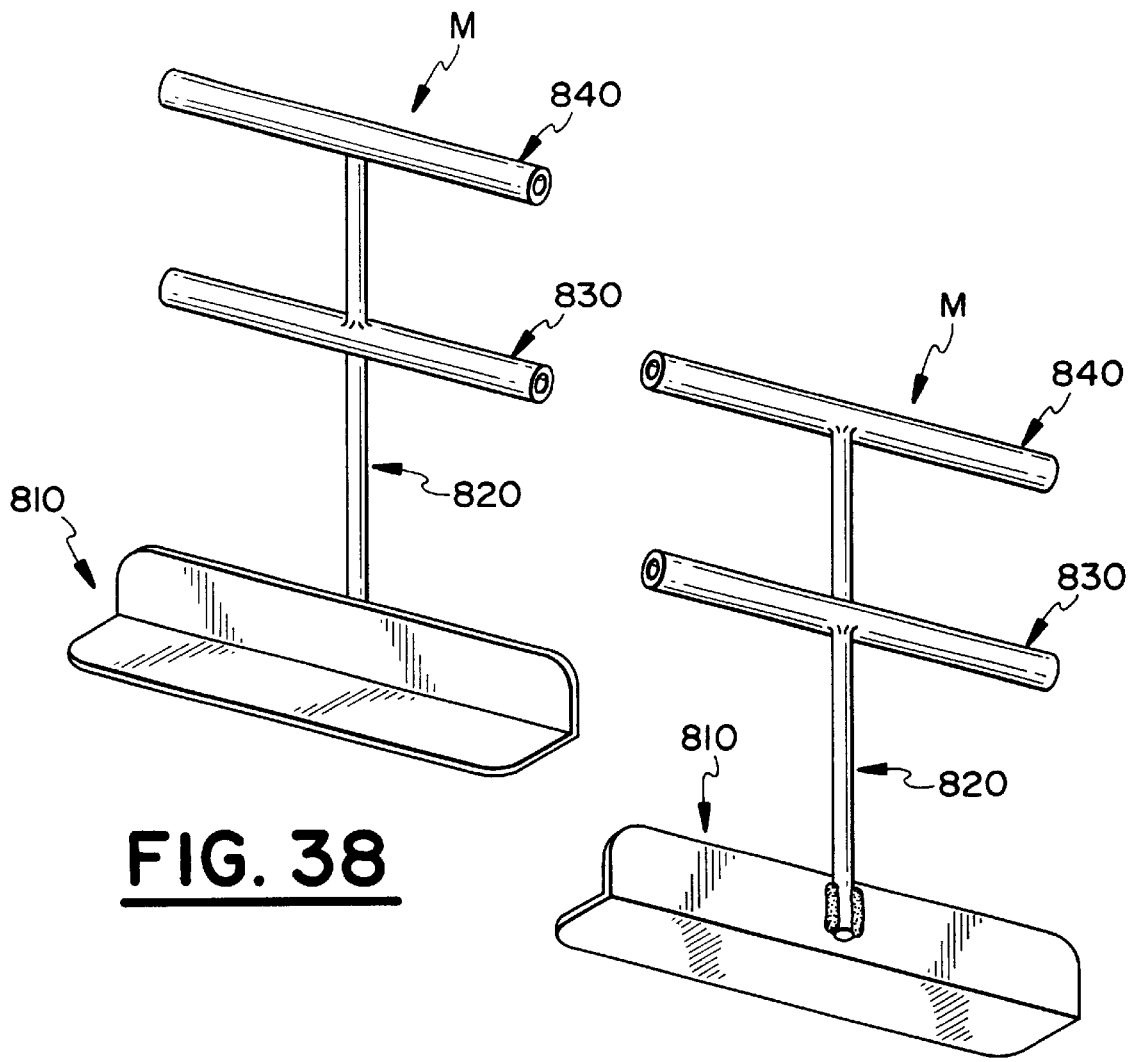
FIG. 38 is a front perspective view of an eleventh embodiment of the present invention.
FIG. 39 is a rear perspective view of the eleventh embodiment of the present invention illustrated in FIG. 38.

FIGS. 38 and 39

The eleventh embodiment of the present invention will now be described with reference to FIGS. 38 and 39. Referring to FIGS. 38 and 39, the device M includes a base 810, a handle 820, and handle grips 830 and 840. Base 810 is identical to base 10 depicted in FIG. 1 and, therefore, will not be described in detail hereinafter. Further, handle 820 is secured to base 810 in the manner depicted in FIG. 2. Handle grips 830 and 840 are permanently secured to handle 820.

FIGS. 40 Through 42

The twelfth embodiment of the present invention will now be described with reference to FIGS. 40 and 41. Referring to FIGS. 40 and 41, the device N includes a base 850, a handle 860, and handle grips 870 and 880. Base 850 includes a horizontal plate 852 which forms an angle of approximately 90° with vertical plate 854. However, it will be readily appreciated to those of ordinary skill in the art that the vertical plate 854 may form angles less than 90° with the horizontal plate 852. For instance, in moving objects such as pipes having a circular cross-section, it may be desirable to orient the vertical plate 854 relative to the horizontal plate 852 such that an angle of less than 90° is formed to prevent the object being moved from rolling off the horizontal plate 852. Both the horizontal and vertical plates have rounded edges to prevent damage to the article to be lifted or carried and/or the surrounding objects. Handle 860 is welded to the rear surface of base plate 854. Alternatively, handle 860 may be otherwise attached to the rear surface of base plate 854. Further, handle 860 is threaded so that an individual may readily vary the position of handle grip 870. Handle grip 880 is permanently secured to handle 860.

A thirteenth embodiment of the present invention will now be described with reference to FIG. 42. This embodiment is similar to the twelfth embodiment depicted in FIGS. 40 and 41 and, therefore, only the differences will be described hereinafter. Base 890 has a horizontal plate 892 having a pair of feet 894 and 896. Feet 894 and 896 each have an opening 898. Handle 900 has threads which extend only a portion of its length. It should be noted that the number of feet may be varied as desired.

Figure 43:
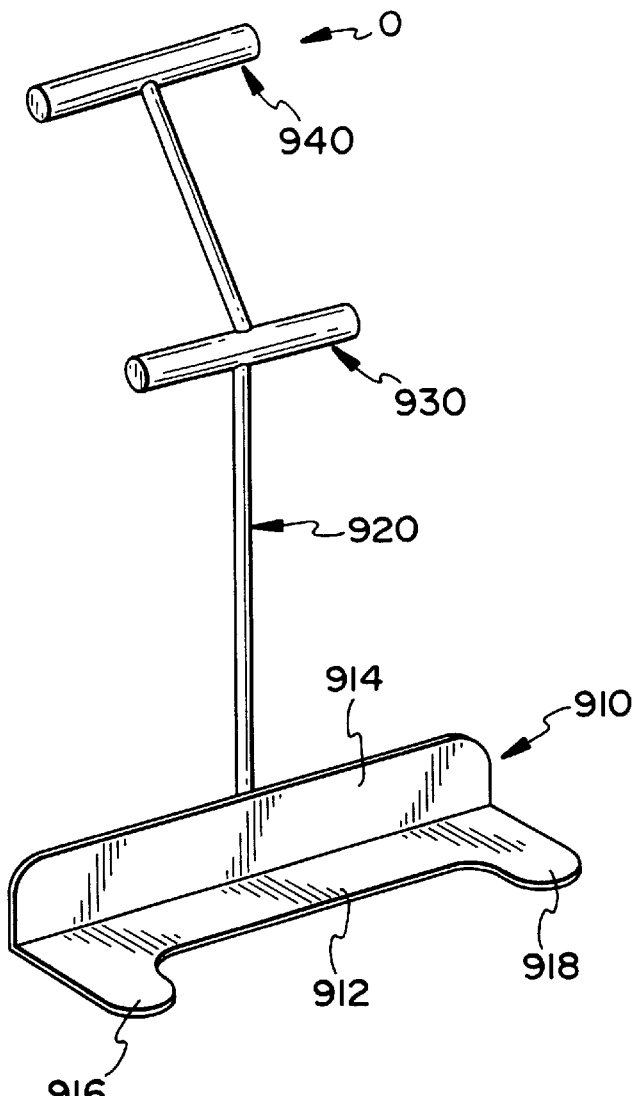
FIG. 43 is a front perspective view of a fourteenth embodiment of the present invention.
Figure 44:
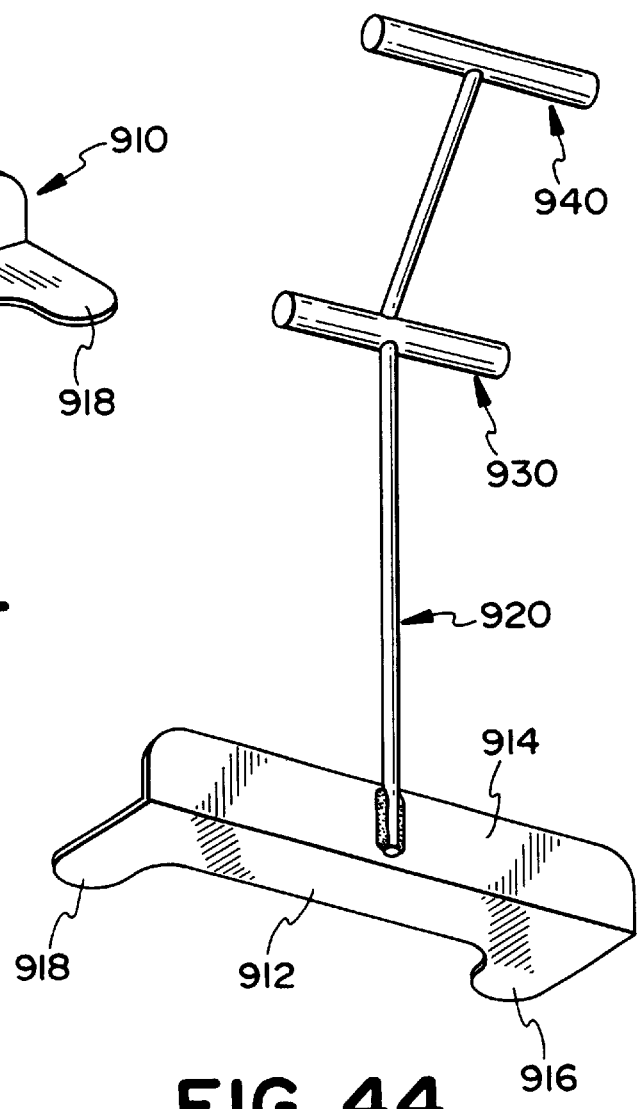
FIG. 44 is a rear perspective view of the fourteenth embodiment of the present invention illustrated in FIG. 43.

FIGS. 43 and 44

The fourteenth embodiment of the present invention will now be described with reference to FIGS. 43 and 44. Device O includes a base 910, a handle 920, and handle grips 930 and 940. Base 910 includes a horizontal plate 912 which forms an angle of approximately 90° with vertical plate 914. Plate 912 includes feet 916 and 918. Both the horizontal and vertical plates have rounded edges to prevent damage to the article to be lifted or carried and/or the surrounding objects. Handle 920 is welded to the rear surface of vertical plate 914. Alternatively, handle 920 may be otherwise attached to the rear surface of vertical plate 914. Handle grips 930 and 940 are permanently secured to handle 920.

It should be noted that the article movers described and referenced herein, or the components of the article movers described herein, can be entirely fabricated from individual components, can be the product of injection molding, casting, or suitable processes, or can be a combination of fabrication, injection molding, casting, or other suitable processes. It should be further noted that components of the present invention herein described and referenced can often be attached to, and interchangeable with, various other components of the present invention herein described. The base portion of the article movers described herein may be rectangular, circular or other configuration. Further, the base portion may be formed of metal, plastic, fiberglass or other suitable material or combination of materials. The base may include one or more openings or perforations for one or more of the reasons previously described. The base may be hollow, solid, or a combination of both hollow and solid. Further, the surface of the base may be minimally or substantially perforated, smooth, dimpled, ridged, ribbed or other wise raised to facilitate structural integrity or to facilitate increased friction between the base and the object being lifted or carried. Further, the base may be minimally or substantially perforated to lessen the weight of the article mover, facilitate the joining of a plurality of the present invention, facilitate structural integrity, facilitate the wrapping or binding of objects being moved, or to facilitate the use of rubberized or other inserts designed to increase friction between the base and the object being lifted, carried, or otherwise moved. The base, in part or in total, may be designed to accommodate a covering of foam, rubber or other material. Further, the base may be so covered during or after the manufacturing process of the article mover. The handle grip, or handle grips, of the article movers described herein may be rectangular, circular, or of some other shape. The handle grip, or handle grips may be formed of metal, plastic, fiberglass, or some other material or combination of materials. The handle grip, or handle grips, may cross the handle or be only on one side. The handle grip, or handle grips, in part or in total, may be designed to accommodate a covering of foam, rubber or other material. Further, the handle grip, or handle grips, may be so covered during or after the manufacturing process of the article mover. The handle grip, or handle grips, may be parallel, perpendicular, or otherwise angled in relation to the base. The handle grip, or handle grips, may be parallel, perpendicular, or otherwise angled in relation to the handle. Different handle grips used on the present invention may be simultaneously parallel, perpendicular, or otherwise angled, in relation to the base. The handle grip, or handle grips, may be hollow, solid, or a combination of both hollow and solid. The handle grip, or handle grips, may contain one or more indentations or perforations designed to accommodate and facilitate the attachment of hooks, ropes, straps, etc. The handle grip, or handle grips, may be moveable along all or part of the handle. The handle grip, or handle grips, may contain an opening, designed to facilitate the movement of said handle grip or handle grips along the handle. The handle grip, or handle grips, may contain a plurality of openings, designed to facilitate the movement of said handle grip along the handle as well as to facilitate the location of greater or lesser portions of the handle grip, or handle grips, on either side of the handle. The handle grip, or handle grips, may contain an opening or a plurality of openings designed to facilitate the connection of said handle grip or handle grips with another article mover or a plurality of other article movers. The handle grip, or handle grips, in total or in part, may be temporarily or permanently inwardly or outwardly disposed in relation to the object being moved. The handle grip, or handle grips, in total or in part, may be temporarily or permanently inwardly or outwardly disposed in relation to the base of the present invention. Further, the handle grip, or handle grips, may be minimally or substantially perforated to lessen the weight of the article mover, facilitate the joining of a plurality of the present invention, facilitate structural integrity, or facilitate the wrapping or binding of objects being moved. A plurality of handle grips may be permanently or temporarily attached to one handle, or a plurality of handles, permanently or temporarily attached to the base of the present invention. A handle grip may be permanently or temporarily attached to one handle, or a plurality of handles, permanently or temporarily attached to the base of the present invention. The handle or handles of the article movers described herein may be circular, rectangular, or of some other shape. The handle or handles may be hollow, solid, or a combination of both hollow and solid. The handle or handles may be formed of metal, plastic, fiberglass, or some other material or combination of materials. The handle or handles may contain a plurality of perforations or openings designed to accommodate and facilitate the attachment of hooks, ropes, straps, etc. The handle or handles, in total or in part, may be welded or otherwise permanently attached to the handle grip or handle grips. The handle or handles, in total or in part, may be temporarily attached to the handle grip or handle grips. The handle or handles may be temporarily attached to one or more handle grips while simultaneously being permanently attached to one or more handle grips. The handle, or handles, may be welded or otherwise permanently attached to the base. The handle, or handles, may be temporarily attached or fastened to the base using a wide variety of fastening and connecting mechanisms. The handle or handles, may be temporarily or permanently attached to either side of any vertical portion of the base. The handle or handles, in total or in part, may be temporarily or permanently attached to, or positioned on or along, any vertical portion of the base. The handle or handles may be attached to, or positioned on or along, any portion of any horizontal portion of the base. The handle or handles, in total or in part, may be attachable to and detachable from the base. The handle or handles, in total or in part, may be attachable to and detachable from one or more handle grips. The handle, or handles, in total or in part, may be temporarily or permanently inwardly or outwardly disposed in relation to the base of the present invention. The handle, or handles, in total or in part, may be constructed with an angled portion which is temporarily or permanently inwardly or outwardly disposed in relation to the base of the present invention. The handle or handles, in total or part, may be temporarily or permanently inwardly or outwardly disposed in relation to the article or object being moved. The handle or handles, in total or in part, may be constructed with an angled portion which is temporarily or permanently inwardly or outwardly disposed in relation to the article or object being lifted, carried, or otherwise moved. Further, the handle or handles, in total or in part, may have openings or indentations, or be minimally or substantially perforated, to lessen the weight of the article mover, facilitate the joining of a plurality of the present invention, facilitate structural integrity, or facilitate the wrapping or binding of objects being moved. The handle or handles, in part or in total, used as a part of the present invention, may be composed of a plurality of sections with at least one section being essentially vertical and at least one attachable section containing at least one angle.

While this invention has been described as having a preferred design, it is understood that it is capable of further modifications, uses and/or adaptions following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. A device for the lifting, carrying or otherwise moving of objects, comprising:

a) a base including a generally horizontal portion having a plurality of members extending therefrom for engagement with a portion of an object to be lifted;

b) a handle secured to the base and extending upwardly therefrom, said handle having a longitudinal axis, a plurality of holes are formed along said longitudinal axis;

c) first and second handle grips operably connected to said handle for selective gripping to impose a vertically directed force on said handle and said base thereby lifting an object positioned in engagement with said base, said first handle grip being positioned above said second handle grip, at least one of said first and second handle grips being slidable along said handle to vary its position relative to said base.

2. A device for the lifting, carrying or otherwise moving of objects, comprising:

a) a base including a generally horizontal portion having a plurality of members extending therefrom for engagement with a portion of an object to be lifted;

b) a handle secured to the base and extending upwardly therefrom;

c) first and second handle grips operably connected to said handle for selective gripping to impose a vertically directed force on said handle and said base thereby lifting an object positioned in engagement with said base, said first handle grip being positioned above said second handle grip, second handle grip being slidable along said handle to vary its position relative to said base, said first handle grip being permanently secured to said handle.

3. A device for the lifting, carrying or otherwise moving of objects, comprising a) a base including a generally horizontal portion having a plurality of members extending therefrom for engagement with a portion of an object to be lifted;

b) a handle secured to the base and extending upwardly therefrom;

c) first and second handle grips operably connected to said handle for selective gripping to impose a vertically directed force on said handle and said base thereby lifting an object positioned in engagement with said base, said first handle grip being positioned above said second handle grip, at least one of said first and second handle grips being slidable along said handle to vary its position relative to said base, said first and second handle grips being symmetrically disposed about said handle.

4. A lifting or carrying device, comprising:

a) a base including a generally horizontal portion for engagement with the bottom of an object to be lifted;

b) a handle secured to the base and extending upwardly therefrom, said handle having a plurality of holes formed therein;

c) at least a first handle grip operably connected to said handle for selective gripping to impose a vertically directed force on said handle and said base thereby lifting an object positioned in engagement with said base, said first handle grip having first and second gripping portions formed on opposite sides of said handle, said first handle grip having a first opening formed therein for receiving said handle thereby permitting said handle grip to slide along said handle to vary its position relative to said base, said first handle grip further including a second opening; and, d) securing means adapted to pass through said second opening of said first handle grip and at least one of said plurality of holes in said handle to secure said first handle grip to said handle.

5. A device as set forth in claim 4, further including:

a) a second handle grip operably connected to said handle for selective gripping to impose a vertically directed force on said handle and said base thereby lifting an object positioned in engagement with said base, said second handle grip having a first opening formed therein for receiving said handle thereby permitting said second handle grip to slide along said handle to vary its position relative to said base, said second handle grip further including a second opening: and, b) a removable pin adapted to pass through said second opening of said second handle grip and at least one of said plurality of the holes in said handle to secure said second handle grip to said handle.

6. A device as set forth in claim 5, wherein:

a) said first and second handle grips are symmetrically disposed about said handle.

7. A lifting or carrying device, comprising:

a) a base including a horizontally extending plate having a plurality of feet for engagement with the bottom of an object to be lifted;

b) a handle secured to the base and extending upwardly therefrom;

c) first and second handle grips operably connected to said handle for selective gripping to impose a vertically directed force on said handle and said base thereby lifting an object positioned in engagement with said base, said first handle grip being positioned above said second handle grip, at least one of said first and second handle grips being slidable along said handle to vary its position relative to said base.

8. A device for the lifting, carrying or otherwise moving of objects, comprising:

a) a base including a generally horizontal portion having a plurality of members extending therefrom for engagement with a portion of an object to be lifted;

b) a handle secured to the base and extending upwardly therefrom;

c) first and second handle grips operably connected to said handle for selective gripping to impose a vertically directed force on said handle and said base thereby lifting an object positioned in engagement with said base, said first handle grip being positioned above said second handle grip, at least one of said first and second handle grips being slidable along said handle to vary its position relative to said base; and, d) said base further including a generally vertical portion having a predetermined width, said generally horizontal portion having a length substantially greater than a width of said generally vertical portion.

9. A device as set forth in claim 8, wherein:

a) said generally horizontal portion has a length substantially greater than its width.

\* \* \* \* \*